United States Patent
Lim et al.

(10) Patent No.: US 10,528,780 B2
(45) Date of Patent: Jan. 7, 2020

(54) WEARABLE MOBILE ELECTRONIC DEVICES

(71) Applicant: Symbol Technologies, LLC, Lincolnshire, IL (US)

(72) Inventors: Sunghun Lim, Bethpage, NY (US); JaeHo Choi, Whitestone, NY (US); Curt D. Croley, Stony Brook, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 75 days.

(21) Appl. No.: 15/376,169

(22) Filed: Dec. 12, 2016

(65) Prior Publication Data

US 2018/0167549 A1    Jun. 14, 2018

(51) Int. Cl.
*H04N 5/232*    (2006.01)
*H04N 5/225*    (2006.01)
(Continued)

(52) U.S. Cl.
CPC ......... *G06K 7/10891* (2013.01); *G06F 1/163* (2013.01); *G06K 7/10396* (2013.01); *G06K 7/10554* (2013.01); *G06K 7/10722* (2013.01); *G06K 7/1413* (2013.01); *H04N 5/2252* (2013.01); *G06F 3/0488* (2013.01); *G06F 3/04847* (2013.01)

(58) Field of Classification Search
CPC .. H04N 5/23216; H04N 5/2252; H04N 7/185; G06F 1/163; G06F 3/04883; G06K 19/06028; G06K 7/1413; G06K 7/10891
USPC ....................................................... 348/158
See application file for complete search history.

(56) References Cited

U.S. PATENT DOCUMENTS

| 6,151,208 A | 11/2000 | Bartlett |
| 2003/0209604 A1* | 11/2003 | Harrison, Jr. .......... G04B 25/00 235/462.44 |

(Continued)

FOREIGN PATENT DOCUMENTS

WO    2016044035 A1    3/2016

OTHER PUBLICATIONS

Plummer et al., "Smart rings: The good, the bad and the ugly in smart jewellery," WAREABLE, retrieved from Internet on Oct. 14, 2016 from <http://www.wareable.com/smart-jewellery/best-smart-rings-1340. (13 pages).

(Continued)

*Primary Examiner* — Zaihan Jiang
(74) *Attorney, Agent, or Firm* — Yuri Astvatsaturov

(57) ABSTRACT

A wearable mobile electronic device is provided. The device includes: a housing having a proximal end, a distal end, and a longitudinal axis between the proximal end and the distal end; a lateral axis perpendicular to the longitudinal axis; and a third axis perpendicular to each of the longitudinal axis and the lateral axis; a data capture component, a pointing direction of the data capture component extending from the distal end; a touch display, a front surface of the touch display extending along the longitudinal axis and the lateral axis, the third axis normal to the front surface; and a mounting device configured to mount the housing to a hand such that the pointing direction of the data capture component points away from a wrist and the touch display is accessible to a thumb of the hand.

17 Claims, 24 Drawing Sheets

(51) Int. Cl.
  *H04N 7/18* (2006.01)
  *G06F 1/16* (2006.01)
  *G06K 19/06* (2006.01)
  *G06K 7/14* (2006.01)
  *G06K 7/10* (2006.01)
  *G06F 3/0488* (2013.01)
  *G06F 3/0484* (2013.01)

(56) References Cited

U.S. PATENT DOCUMENTS

| | | | |
|---|---|---|---|
| 2012/0293410 A1 | 11/2012 | Bell | |
| 2013/0300141 A1* | 11/2013 | Byrne | A45F 5/00 294/25 |
| 2015/0113432 A1* | 4/2015 | Jung | G06F 3/04883 715/748 |
| 2015/0133193 A1 | 5/2015 | Stotler | |
| 2015/0237181 A1* | 8/2015 | Khan | H04M 1/0202 455/556.1 |
| 2015/0258431 A1* | 9/2015 | Stafford | A63F 13/213 463/31 |
| 2015/0277559 A1 | 10/2015 | Vescovi et al. | |
| 2017/0014037 A1* | 1/2017 | Coppola | A61B 5/6898 |
| 2017/0020449 A1* | 1/2017 | Shim | A61B 5/7455 |
| 2017/0347262 A1* | 11/2017 | Juliato | H04W 12/06 |
| 2018/0035943 A1* | 2/2018 | Shemesh | A61B 5/02055 |
| 2018/0069720 A1* | 3/2018 | Tiberi | H04L 12/2809 |
| 2018/0070023 A1* | 3/2018 | Oh | G06T 7/55 |
| 2018/0088673 A1* | 3/2018 | Bhalla | H04W 4/80 |
| 2018/0122145 A1* | 5/2018 | Shimura | G02B 27/0172 |

OTHER PUBLICATIONS

Prigg, Mark, "Apple's secret 'superscreen' lab in Taiwan revealed: Firm developing advanced displays that are thinner, lighter and brighter," Daily Mail, published Dec. 15, 2015 (20 pages).

"This is what Apple's smart ring might look like, hsa touchscreen and siri," Tech Blog, published Oct. 3, 2015 (6 pages).

* cited by examiner

WEARABLE MOBILE ELECTRONIC DEVICES

BACKGROUND

Wearable devices often include electronic components, such as scanners (e.g. barcode scanners, and the like), that may be actuated using an interface at the wearable device and/or using a device connected thereto.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and Ruin part of the specification, and serve to further illustrate implementations of concepts described herein, and explain various principles and advantages of those implementations.

Figure 1:
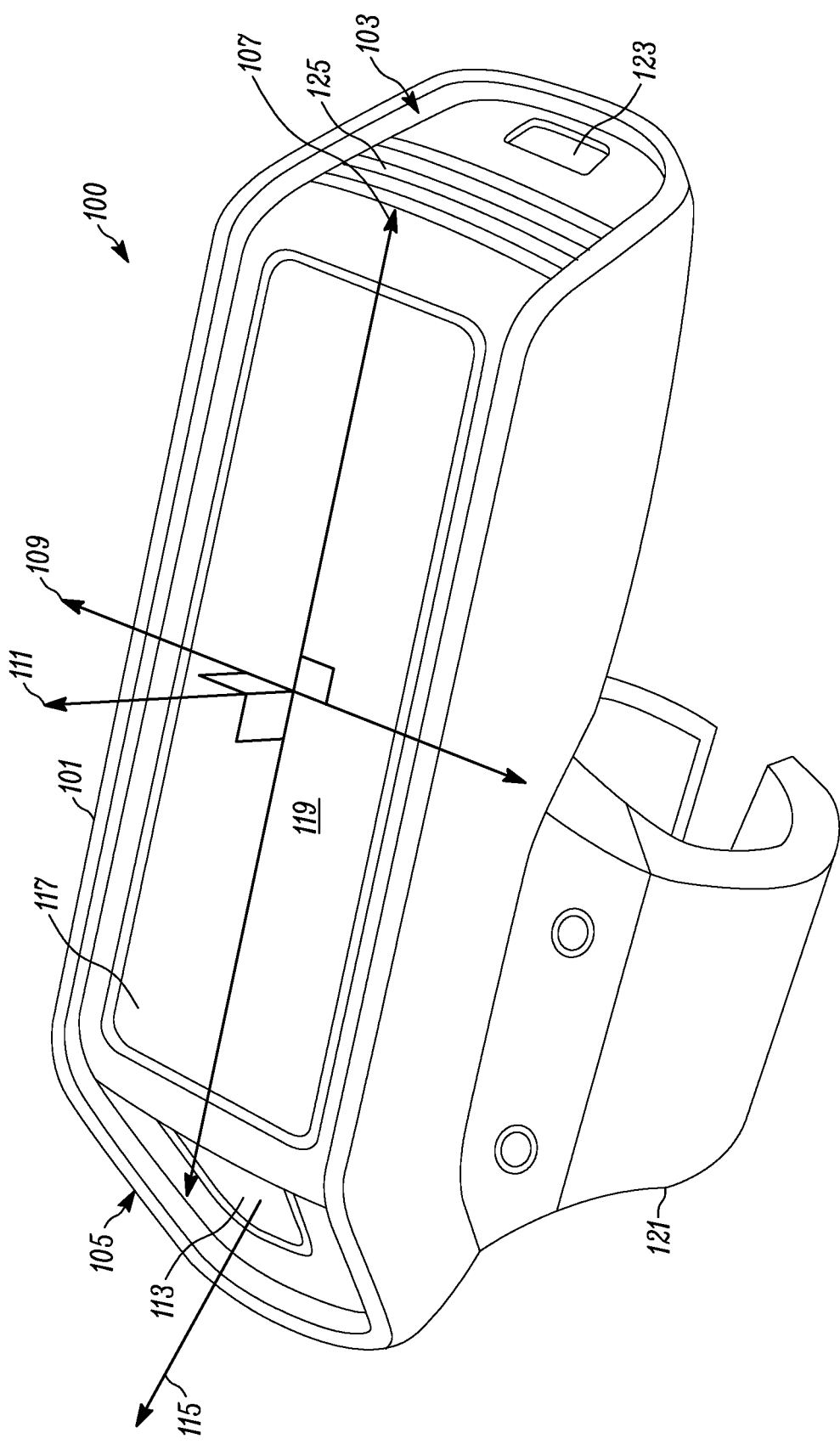
FIG. 1 depicts an example wearable device that includes a ring to mount the wearable device to an index finger of hand such that a touch display of the wearable device is accessible to a thumb of the hand.

The apparatus and method components have been represented where appropriate by conventional symbols in the drawings, showing only those specific details that are pertinent to understanding the implementations of the present specification so as not to obscure the disclosure with details that will be readily apparent to those of ordinary skill in the art having the benefit of the description herein.

DETAILED DESCRIPTION

Wearable devices often include electronic components, such as scanners (e.g. barcode scanners, and the like), that may be actuated using an interface at the wearable device and/or using a device connected thereto. However, such wearable devices may be bulky and/or have configurations that require a user to view the interface at the wearable device and/or an interface rendered at a display of a device connected thereto. Such configurations may result in an ergonomically challenging set of actions by a user such as: view interface—perform action to initiate an action at the electronic component—position the wearable device such that the electronic component may perform the action (such as a barcode scan)—view interface again to confirm the action, and repeat. Such a set of actions may result in physical and/or repetitive stress at the user.

For example, ergonomically, a user may need to stretch their arm to allow the wearable device to perform the action, such as a scan, and then flex and twist their arm to view the interface at the wearable device and/or at a display of a device connected thereto (e.g. which may include an arm mounted wearable terminal); such a situation may lead to both inefficient motion over time, and may cause ulnar deviation.

Furthermore, while a user is working on a job, for example, picking, sorting and loading boxes, while also scanning the boxes, the user may need to pause to look at information on the interface of the wearable device and/or a device connected thereto, which may interrupt a user's work flow and which may decrease their productivity.

In addition, some wearable devices may be required to have a physical mechanism that provides an ambidextrous trigger (for example as a requirement for deployment in work environment), which drive mechanical complexity and cost, and which may increase a height of wearable devices, which may be a critical factor for warehouse worker (e.g. a higher wearable device may interfere with boxes when the user reaches to grab, for example, a piled box).

Examples disclosed herein are directed to a wearable device which may be worn on a hand, and which includes: a housing having a proximal end, a distal end, and a longitudinal axis there between; a lateral axis perpendicular to the longitudinal axis, and a third axis perpendicular to each of the longitudinal axis and the lateral axis; a data capture component located at the proximal end, a pointing direction of the data capture component extending from the proximal end; a touch display, a front surface of the touch display extending along the longitudinal axis and the lateral axis, the third axis normal to the front surface; and a mounting device configured to mount the housing to a hand such that the pointing direction of the data capture component points away from the hand and the touch display is accessible to a thumb of the hand.

Such an arrangement enables a user to interact with the touch display while gripping the boxes with the same hand on which the wearable device is worn.

Furthermore, as the touch display is accessible to a thumb of the hand, the touch display, as well as a graphic user interface rendered at the touch display, is in line both with a user's natural and/or ergonomic hand pose, and a natural and/or ergonomic view of a user, for example when the user approaches objects (such as boxes) that include barcodes to be scanned with the data capture component. Such features decrease potential work injury by enabling the user to avoid inefficient motions (such as stretching their aim to scan, flexing and twisting their arm to view the touch display).

Hence, example wearable devices disclosed herein address ergonomic inefficiencies of some other wearable devices, which results in: a reduction of user fatigue; an increase a user's reserve capacity; an elimination of wasteful motions; a reduction in scanning cycle times; an optimization muscle work performed done per scan cycle; a reduction in of direct and indirect costs associated with lost time, turnover, absenteeism and administrative overheads; and an uninterrupted workflow and/or increased productivity.

An aspect of the specification provides: a mobile device comprising: a housing having a proximal end, a distal end, and a longitudinal axis between the proximal end and the distal end; a lateral axis perpendicular to the longitudinal axis; and a third axis perpendicular to each of the longitudinal axis and the lateral axis; a data capture component, a pointing direction of the data capture component extending from the distal end; a touch display, a front surface of the touch display extending along the longitudinal axis and the lateral axis, the third axis normal to the front surface; and a mounting device configured to mount the housing to a hand such that the pointing direction of the data capture component points away from a wrist and the touch display is accessible to a thumb of the hand.

In some example implementations, at least the housing and the touch display are symmetric about the longitudinal axis.

In some example implementations, the mounting device comprises a ring.

In some example implementations, the mounting device comprises a webbing configured for attachment between an index finger and the thumb of the hand.

In some example implementations, the mounting device comprises a glove.

In some example implementations, the mounting device is configured to mount the housing to the hand such that the proximal end is located towards a palm of the hand, the distal end is located towards tips of fingers of the hand with the fingers extended, the longitudinal axis located between an index finger and the thumb of the hand, and the touch display is oriented towards the thumb of the hand.

In some example implementations, an orientation of a display rendered at the touch display is configurable between a right-hand mode and a left-hand mode.

In some example implementations, the data capture component comprises a camera, a lens of the camera located at the distal end, the lens defining the pointing direction.

In some example implementations, the data capture component comprises a scanner, a data capture end of the scanner located at the distal end, the data capture end defining the pointing direction.

In some example implementations, the data capture component comprises one or more of a camera, a scanner, a laser-based scanner, a laser-based engine, and an image, a data capture end of the data capture component located at the distal end, the data capture end defining the pointing direction.

In some example implementations, the pointing direction is one or more of parallel to the longitudinal axis, perpendicular to the lateral axis, and perpendicular to the third axis.

In some example implementations, the pointing direction is controllable using the touch display.

In some example implementations, the touch display is configured to activate the data capture component when touch input is received at the touch display.

In some example implementations, the touch display is configured to indicate a successful data capture by the data capture component.

In some example implementations, the mobile device further comprises an electronic visual indicator located at the proximal end, the electronic visual indicator configured to indicate a successful data capture by the data capture component.

In some example implementations, the mobile device further comprises a speaker configured to indicate a successful data capture by the data capture component.

In some example implementations, the mobile device further comprises a processor interconnected with the data capture component and the touch display, the processor configured to control the data capture component to initiate a data capture when touch input is received at the touch display. In some of these implementations, the processor is configured to control one or more of the touch display, a speaker, and an electronic visual indicator, located at the proximal end, to indicate a successful data capture by the data capture component.

Attention is directed to FIG. 1 which depicts an example mobile device 100 constructed in accordance with teachings of this disclosure. The example mobile device 100 of FIG. 1 is mountable to a hand, mobile device 100 interchangeably referred to hereafter as device 100. The example device 100 of FIG. 1 includes: a housing 101 having: a proximal end 103, a distal end 105, and a longitudinal axis 107 between the proximal end 103 and the distal end 105; a lateral axis 109 perpendicular to longitudinal axis 107, and a third axis 111 perpendicular to each of the longitudinal axis 107 and the lateral axis 109; a data capture component 113 a pointing direction 115 of the data capture component 113 extending from the distal end 105; a touch display 117, a front surface 119 of the touch display 117 extending along the longitudinal axis 107 and the lateral axis 109, the third axis 111 normal to the front surface 119; and a mounting device 121 configured to mount the housing 101 to a hand such that the pointing direction 115 of the data capture component 113 points away from a wrist and the touch display 117 is accessible to a thumb of the hand, as described in further detail below.

In the present specification, the term "proximal" will be used to refer to components of device the 100 that are to be located closer to a wrist of a user when the device 100 is mounted to a hand of the user. As used herein, the term "distal" will be used to refer to components of the device 100 that are to be located away from (e.g. distal from) a wrist of a user when the device 100 is mounted to a hand of the user.

In the example of FIG. 1, the housing 101 has sides that extend from a front (e.g. a bezel around the front surface 119 of the touch display 117) towards a back of the housing 101, with a distal side located at the distal end 105 and a proximal side located at the proximal end 103. As depicted in the example of FIG. 1, each of the distal side located at the distal end 105 and the proximal side located at the proximal end 103 slopes towards the back of the housing 101 such that the back of the housing 101 is larger than a front of the housing 101. Similarly, sides of the example housing 101 of FIG. 1 that connect the distal side and the proximal side may also slope towards the back of the housing 101.

In some implementations, the data capture component 113 includes a camera, a lens of the camera located at distal end 105, the lens defining pointing direction 115. In some implementations, data capture component 113 includes a scanner, a data capture end of the scanner located at the distal end 105, the data capture end defining the pointing direction 115. In some examples, the data capture component 113 includes one or more of a camera, a scanner, a laser-based scanner, a laser-based engine, and an imager, a data capture end of the data capture component 113 located at the distal end 105, the data capture end defining the pointing direction 115. In the example of FIG. 1, the pointing direction 115 is parallel to the longitudinal axis 107, perpendicular to the lateral axis 109, and perpendicular to the third axis 111.

In some implementations, the pointing direction 115 is controllable using, for example, the touch display 117. In other words, in some implementations, a field-of-view of lens of a camera, a laser-based scanner, a laser-based engine, and an imager and the like are adjustable to change and/or move the pointing direction 115, for example to a direction extending from the distal end 105 that may be more ergonomically suitable for a given user, as described below with reference to FIG. 7.

In some examples, the data capture end of the data capture component 113 includes the components of the data capture component 113 that define the pointing direction 115 and/or a field-of-view of the data capture component 113. While such components may be located at the distal end 105, and in particular at the distal side of the housing 101, and while the distal side of the housing 101 may be sloped, the pointing direction 115 may nonetheless be about parallel to longitudinal axis 107. In some implementations, the pointing direction 115 is controllable and/or moveable and/or steerable using the touch display 117.

While internal components of the data capture component 113 may be located anywhere within device 100, the data capture components (e.g. located at a data capture end of the data capture component 113) may extend and/or at least point from the distal end 105, for example about parallel to the longitudinal axis 107, whether the distal side of the housing 101 at the distal end 105 is sloped or not.

In the illustrated example, the device 100 includes: an electronic visual indicator 123 located at the proximal end 103, the electronic visual indicator 123 configured to indicate a successful data capture by the data capture component 113. In the illustrated example of FIG. 1, the device 100 includes a speaker 125 configured to indicate a successful data capture by the data capture component 113. While as depicted the speaker 125 is located at the proximal end 103, the speaker 125, when present, can be located at any position of the device 100 where sound emitted by the speaker 125 can be heard by a user wearing device 100. In the example of FIG. 1, each of the electronic visual indicator 123 and the speaker 125 is located on a proximal side of housing 101 at the proximal end 103.

In the illustrated example of FIG. 1, the housing 101 is generally longer in a direction of the longitudinal axis 107 than in a direction of the lateral axis 109. In other words, the housing 101 is generally longer than it is wide. Furthermore, in the illustrated example of FIG. 1, a height of the housing 101, in a direction of the third axis 111, is generally smaller than either of dimensions of the housing 101 in either of a direction of the longitudinal axis 107 and in a direction of the lateral axis 109. In some examples, a height of the housing 101 and/or a dimension of the housing 101 in a direction of the third axis 111 is between about 1 mm and about 1.5 cm, though any height of housing 101 and/or a dimension of the housing 101 in a direction of the third axis 111 is within the scope of present implementations that will allow the device 100 to be worn by a hand such that the pointing direction 115 of data capture component 113 points away from the wrist and touch display 117 is accessible to a thumb of the hand.

In some examples, at least housing 101 and front surface 119 of touch display 117 are symmetric about longitudinal axis 107, which may assist with device 100 being used ambidextrously, as described in further detail below with reference to FIG. 6.

Figure 2:
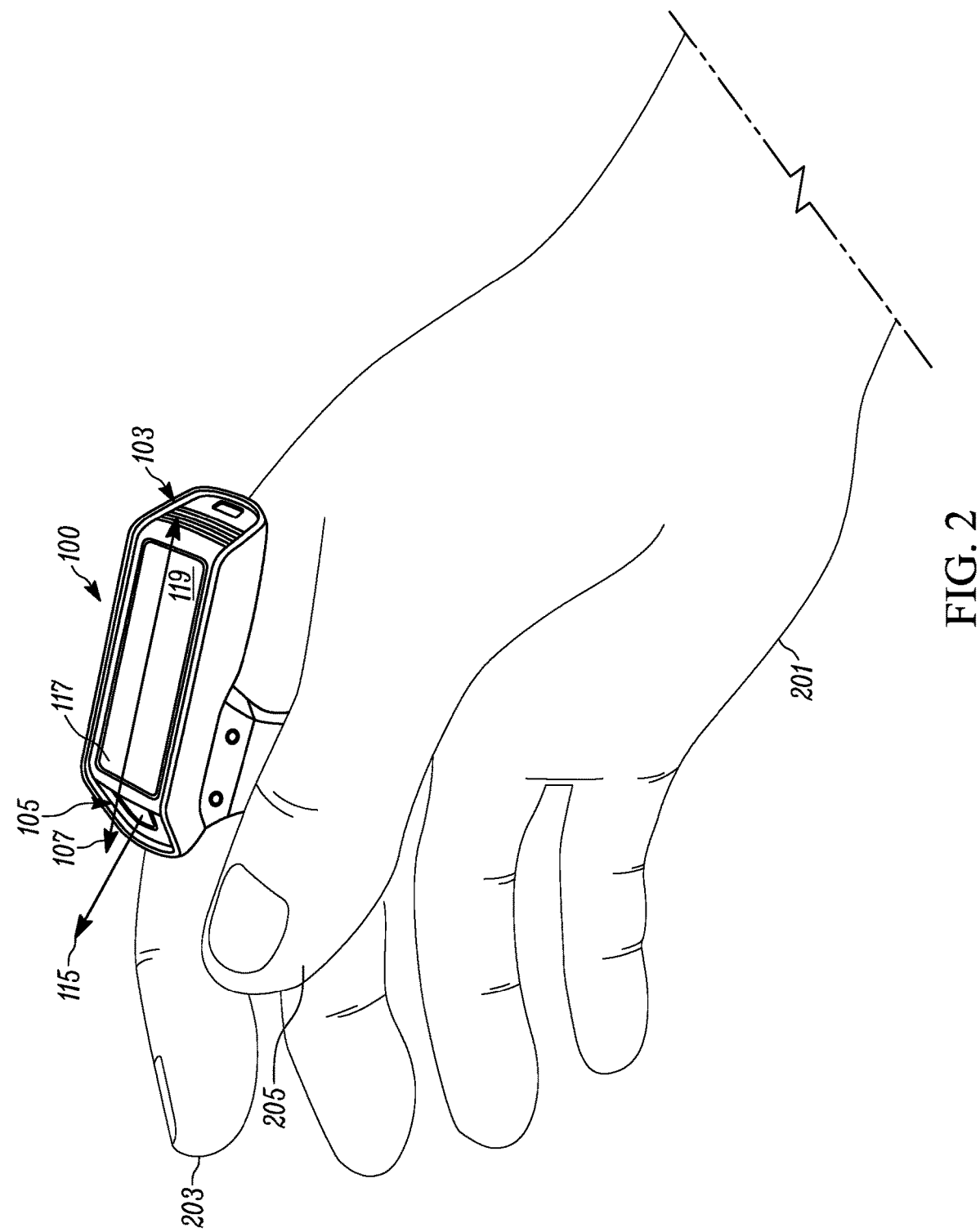
FIG. 2 depicts a perspective view of the example wearable device of FIG. 1 mounted to a hand.
Figure 3:
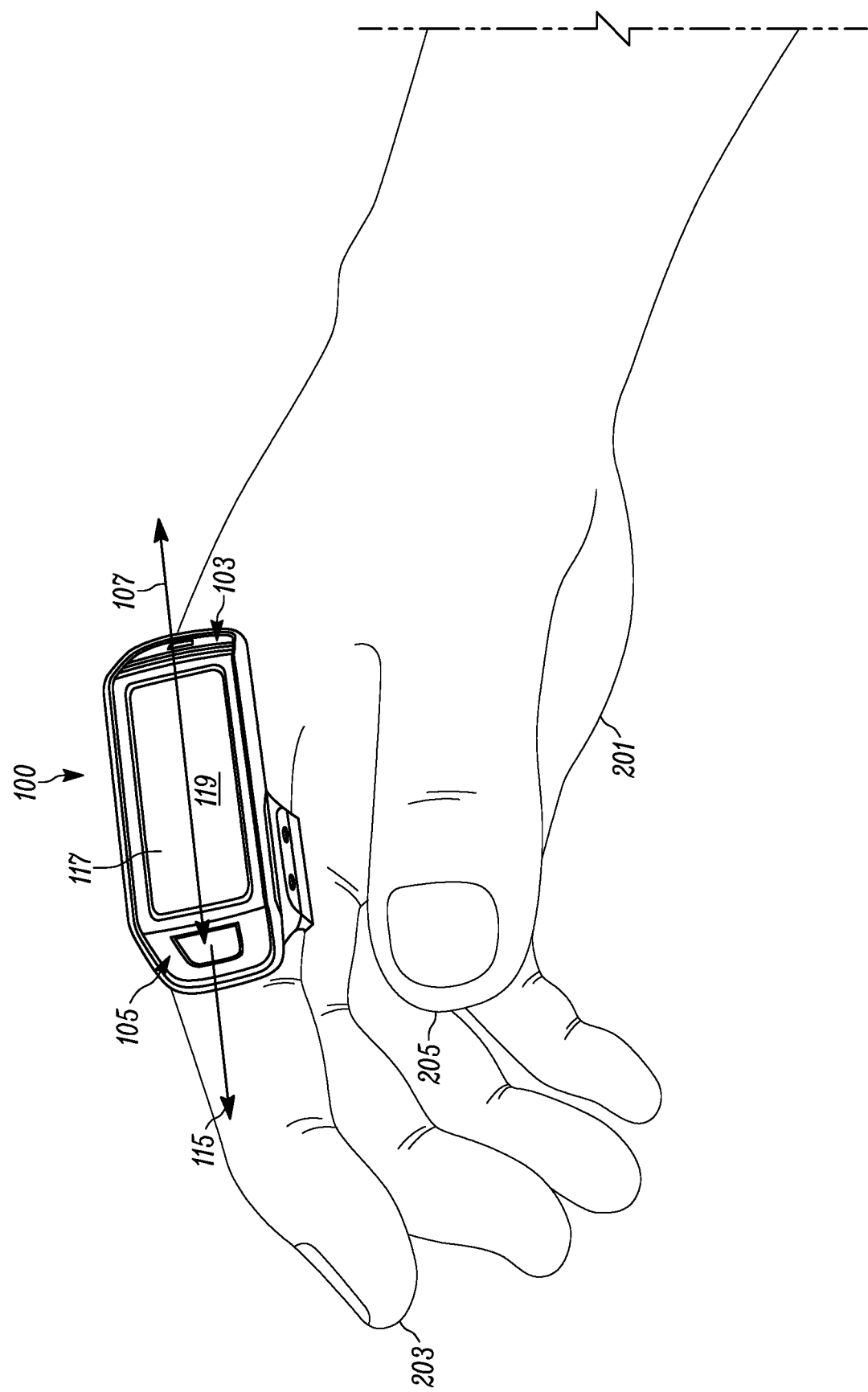
FIG. 3 depicts a perspective view of the example wearable device of FIG. 1 mounted to the hand from another angle.

In the example of FIG. 1, mounting device 121 includes a ring which can be worn on an index finger of either a right hand or a left hand. For example, attention is next directed to FIG. 2 and FIG. 3 each of which depict the example device 100 mounted on a right hand 201 of a user, with FIG. 2 depicting a side perspective view of the device 100, and FIG. 3 depicting a front perspective view of the device 100. In the illustrated example, the device 100 is ring-mounted on an index finger 203 of the hand 201, and furthermore each of FIG. 2 and FIG. 3 depicts a relative position of components of the device 100 relative to a thumb 205 of the hand 201.

In some examples, the mounting device 121 is attached to a bottom side of the housing 101, and between a longitudinal center of the housing 101 and the distal end 105. A plane of an opening of the ring is in a plane formed by the lateral axis 109 and the third axis 111 (and/or the longitudinal axis 107 is about normal to the opening of the ring). Hence, when the device 100 is mounted to the hand 201, for example by slipping the index finger 203 through the ring of the mounting device 121, distal end 105 is positioned towards an end of the index finger 203 (and/or the pointing direction 115 points along the index finger 203 and/or the pointing direction 115 points away from the user), and the proximal end 103 is positioned away from an end of the index finger 203 and/or towards the user.

The example device 100 can be rotated on the ring such that the front surface 119 of the touch display 117 is accessible to the thumb 205 and/or the front surface 119 of the touch display 117 faces the thumb 205 The height of the housing 101 is selected to not interfere with the thumb 205 and the index finger 203 performing work, such as the hand 201 being used in picking up and/or moving boxes, while the front surface 119 of the touch display 117 remains accessible to the thumb 205.

Put another way, the example mounting device 121 is configured to mount the housing 101 to the hand 201 such that the proximal end 103 is located towards a palm of the hand 201 (and/or an area between the index finger 203 and the thumb 205 of the hand 201), the distal end 105 is located towards tips of fingers of the hand 201 with the fingers extended, the longitudinal axis 107 is located between the index finger 203 and the thumb 205 of the hand 201, and the touch display 117 is oriented towards the thumb 205 of the hand 201. For example, with reference to FIG. 3, the longitudinal axis 107 is located between the index finger 203 and the thumb 205 of the hand 201 and the front surface 119 of the touch display 117 can be touched by the thumb 205, for example when the thumb 205 is moved towards a side of the index finger 203.

As the example mounting device 121 of FIG. 1 is positioned between a longitudinal center of the housing 101 and the distal end 105, and hence asymmetrically positioned relative to a longitudinal center of the housing 101, the proximal end 103 is configured to extend along a side of the index finger 203 towards a base of the index finger 203 and/or towards the side of the hand 201 adjacent a base of the thumb 205 and/or at least partially towards a back of the hand 201 and/or towards a palm of the hand 201.

In the illustrated example, a distance between a longitudinal center of the housing 101 and the distal end 105 is selected such that the distal end 105 is located about adjacent to a side of a first knuckle of the index finger 203 when the device 100 is mounted to the hand 201. Such a configuration enables the hand 201 to pick up items without the device 100 interfering with such motions.

As the front surface 119 of the touch display 117 is accessible to the thumb 205, the thumb 205 can interact with the touch display 117 and, specifically, touch input can be received at the touch display 117 via the thumb 205 touching the front surface 119 of the touch display 117.

In some examples, touch display 117 is configured to activate data capture component 113 when touch input is received at touch display 117, for example to capture data (such as an image, a barcode scan, and the like). For example, a user wearing device 100 on an index finger may point distal end 105 of device 100 at an item to be scanned, and the like (including, for example, an object on which a barcode identifier is located), and touch front surface 119 of touch display 117 with their thumb, which activates data capture component 113 to capture the barcode.

In some examples, touch display 117 is configured to indicate a successful data capture by data capture component 113; for example, when data is captured by data capture component 113, touch display 117 may be controlled to indicate such a data capture including, for example, rendering of text and/or graphics.

Alternatively, when present, one or more of electronic visual indicator 123 and speaker 125 may be controlled to indicate a successful data capture; for example, electronic visual indicator 123 includes one or more of a light, a light emitting diode (LED) controllable to blink and/or emit light to indicate a successful data capture, and/or speaker 125 may be configured to play a tone corresponding to a successful data capture. In some implementations, electronic visual indicator 123 includes a display at the proximal end 103 that render, for example, an icon indicating a successful data capture.

With further reference to FIG. 2 and FIG. 3, positioning of the front surface 119 of the touch display 117 at a side of the index finger 203 such that the front surface 119 of the touch display 117 is accessible to the thumb 205 enables the touch display 117 to be easily viewed by a user wearing the device 100, when the hand 201 of the user is in front of the user with a palm of the hand 201 generally facing down, and/or sideways and/or in a position to pick up an object. In other words, ergonomically, when a user picks up an object, the user generally reaches toward the object with the palm of the hand facing away from the user, which causes a side of their index finger and a top of their thumb to be visible; hence a touch display positioned on a side of their index finger (e.g. the touch display 117 positioned at side of the index finger 203) will generally be visible. Hence, the configuration of the device 100 depicted in FIG. 1, FIG. 2 and FIG. 3 has ergonomic benefits compared to, for example, other wearable devices in which displays are mounted elsewhere (such as on a back of a hand, which may be more likely to be obscured as the user turns their hand to pick up the object).

Figure 4:
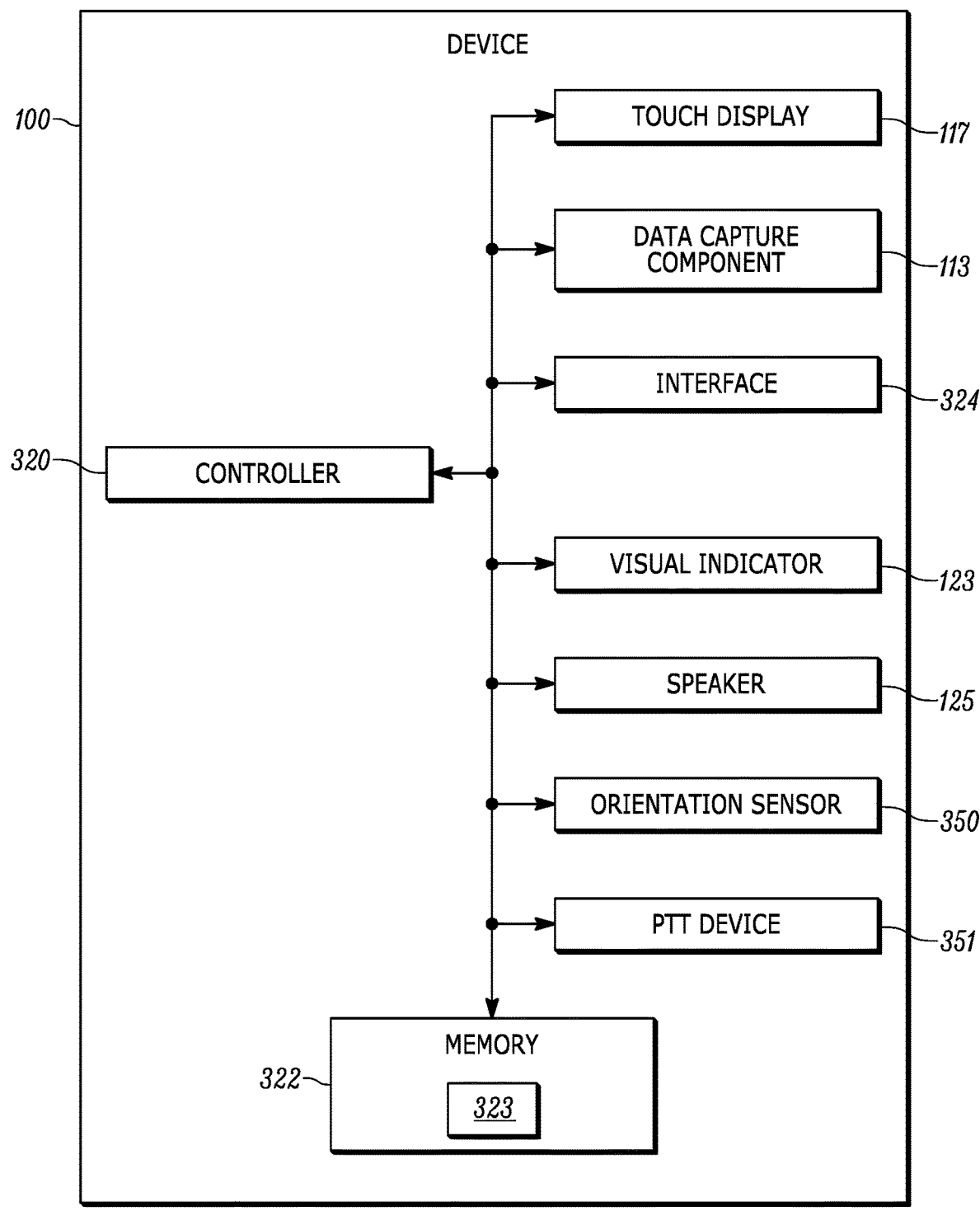
FIG. 4 depicts a schematic diagram of an example implementation of the wearable device of FIG. 1.

Attention is next directed to FIG. 4, which depicts a schematic diagram of an example implementation of the device 100. In the example of FIG. 4, the device 100 includes a controller 320 in communication with a memory 322 storing an application 323, a communication interface 324 (interchangeably referred to hereafter as interface 324), the data capture component 113 and the touch display 117, and the electronic visual indicator 123 and the speaker 125. In the example of FIG. 4, the controller 320 is in communication with an orientation sensor 350 and a push-to-talk (PTT) device 351.

In some examples, the device 100 includes any suitable additional or alternative components such as, for example, a cellular module, a warehouse inventory tracking and/or other data acquisition application, a radio frequency identification (RFID) reader, and/or a Near Field Communication (NFC) reader.

The example controller 320 of FIG. 4 includes one or more logic circuits configured to, for example, implement data capture functionality of the device 100. Example logic circuits include one or more processors, one or more microprocessors, one or more ASIC (application-specific integrated circuits) and one or more FPGA (field-programmable gate arrays). In the example of FIG. 4, the controller 320 is configured to control the data capture component 113 upon receipt of touch input from the touch display 117, and to control one or more of the touch display 117, the electronic visual indicator 123 and the speaker 125 to provide an indication of a successful (or unsuccessful) data capture. In some examples, the device 100 is not a generic computing device, but a wearable device specifically configured to implement specific data capture functionality. For example, the device 100 and/or the controller 320 may specifically comprise a computer executable engine configured to specific data capture functionality.

The memory 322 of FIG. 4 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random access memory ("RAM")). In the example of FIG. 4, programming instructions (e.g., machine readable instructions) that implement the functional teachings of the device 100 as described herein are maintained, persistently, in the memory 322 and used by the controller 320 which makes appropriate utilization of volatile storage during the execution of such programming instructions.

The example memory 322 of FIG. 4 stores instructions corresponding to the application 323 that, when executed by the controller 320, enables the controller 320 to implement data capture functionality associated with the application 323. In the illustrated example, when the controller 320 executes the application 323, the controller 320 controls the data capture component 113 to initiate a data capture when touch input is received at the touch display 117. Additionally, the example controller 323 executes the application 323 to control one or more of the touch display 117, the speaker 125, and the electronic visual indicator 123, located at the proximal end 103, to indicate a successful data capture by the data capture component 113.

The example interface 324 of FIG. 4, which is implemented by, for example, one or more radios and/or connectors and/or network adaptors, is configured to communicate wired and/or wirelessly with network architecture that is used to implement one or more communication links between other devices and/or a network. Example communication links include any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like, wireless data, WLAN (wireless local area network) links, WiFi links, WiMax links, packet based links, the Internet, analog networks, the PSTN (public switched telephone network), access points, and the like, and/or a combination.

The example orientation sensor 350 of FIG. 4 is implemented by, for example, an accelerometer, a magnetometer, and/or a Global Positioning System (GPS) device. The example orientation sensor 350 of FIG. 4 senses and/or determines an orientation of the device 100.

The example PTT device 351 of FIG. 4 includes, for example, a PTT radio (which may be combined with the interface 324), a PTT button to activate the PTT device 351, and/or any suitable combination of speakers and microphones. In some examples, the PTT device 351 is activated using the orientation sensor 350 as described in more detail below.

The example controller 320 of FIG. 4 communicates with the touch display 117 which includes, for example, any suitable one of, or combination of, flat panel displays (e.g. LCD (liquid crystal display), plasma displays, OLED (organic light emitting diode) displays), as well as capacitive or resistive touchscreens The example controller 320 of FIG. 4 communicates with input devices (not depicted) of the device 100. Example input devices include a keyboard, a keypad, a pointing device, a mouse, a track wheel, a trackball, and a touchpad. Additionally, the example touch display 117 of FIG. 1 can be used as an input device to control functionality of the device 100, for example, using graphic user interfaces and/or pull down menus.

While not depicted, the example device 100 of FIG. 4 comprises a power supply such as, for example, a battery, a rechargeable battery, a power pack, and/or a rechargeable power pack. The power supply powers components of the device 100, such that the device 100 is wearable and portable without connection to a mains power supply. In some examples, the device 100 includes a connection to a mains power supply and/or a power adaptor (e.g. an AC-to-DC (alternating current to direct current) adaptor) configured to charge the power supply. In some implementations, the power supply of the device 100 is configured to charge in a charging cradle and/or wirelessly. In some implementations, the power supply of the device 100 is configured for quick charging, for example using inductive charging.

The example device 100 may include additional or alternative components related to, for example, telephony, messaging, entertainment, and/or any other components that may be used with a mobile device.

Figure 5:
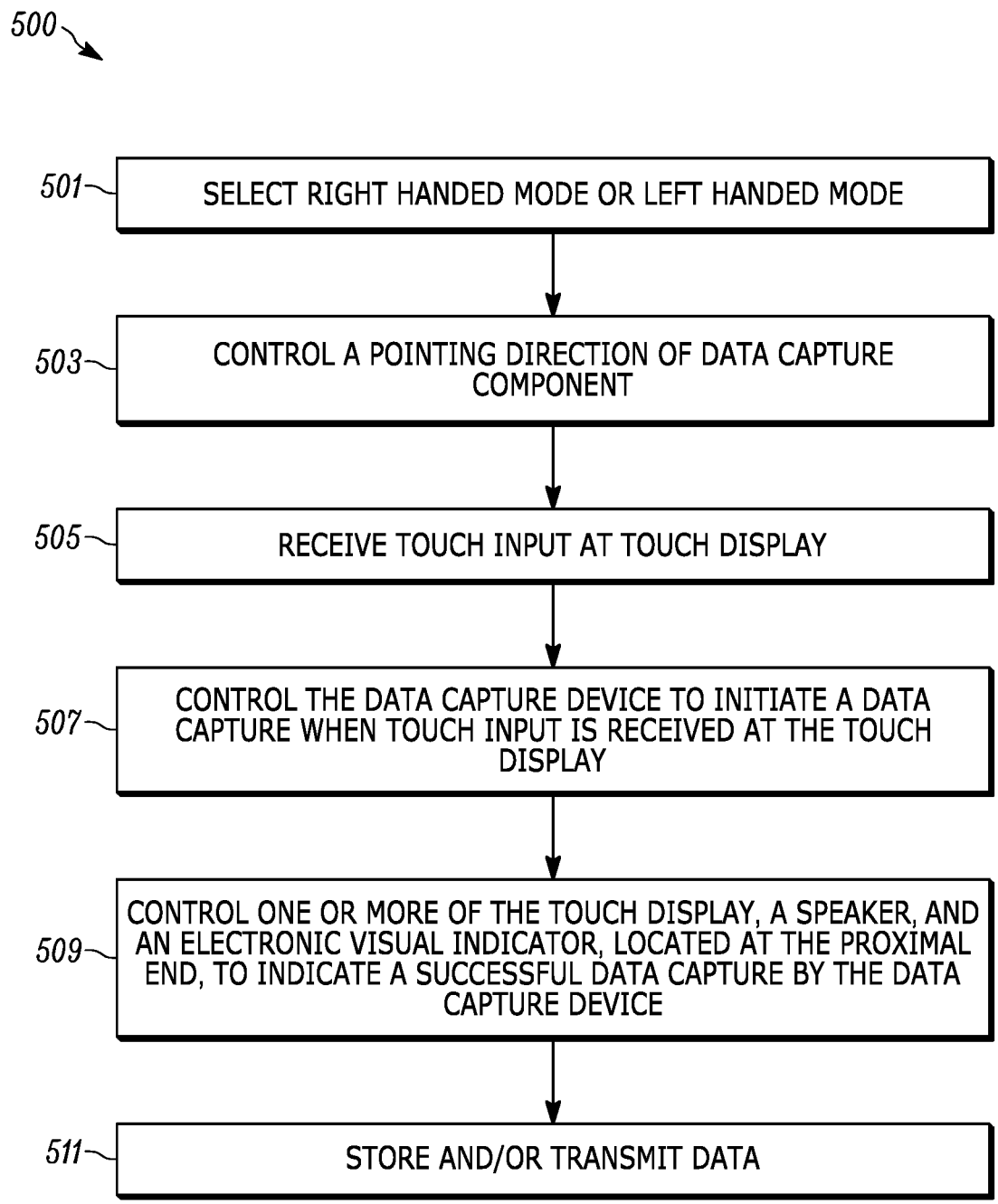
FIG. 5 depicts a flowchart representative of an example method for controlling a wearable device.

Attention is now directed to FIG. 5 which depicts a flowchart representative of an example method 500 for controlling a wearable device, such as the example device 100 of FIG. 4. The example operations of the method 500 of FIG. 5 correspond to machine readable instructions that are executed by, for example, the device 100 of FIG. 4, and specifically by the controller 320 of the device 100. In the illustrated example, the instructions represented by the blocks of FIG. 5 are stored at the memory 322, for example, as the application 323. The example method 500 of FIG. 5 is one way in which the device 100 may be configured. Furthermore, the following discussion of the example method 500 of FIG. 5 will lead to a further understanding of the device 100, and its various components. However, it is to be understood that the device 100 and/or the method 500 may be varied, and need not work exactly as discussed herein in conjunction with each other, and that such variations are within the scope of present implementations.

The example method 500 of FIG. 5 need not be performed in the exact sequence as shown and likewise various blocks may be performed in parallel rather than in sequence. Accordingly, the elements of method 500 are referred to herein as "blocks" rather than "steps." The example method 500 of FIG. 5 may be implemented on variations of the example device 100 of FIG. 4, as well.

In the following discussion of the example method 500 of FIG. 5, the device 100 is mounted to the index finger 203 of the hand 201, as depicted in FIG. 2 and FIG. 3.

At block 501, the controller 320 selects a right-hand mode or a left-hand mode of the device 100, which controls a direction in which text, images and the like are rendered at the touch display 117, as described in more detail below. Furthermore, such a selection may be performed when the device 100 is mounted to the hand 201 and/or prior to being mounted on the hand 201. Alternatively, the device 100 may be configured to be used always in one of a right-hand mode or a left-hand mode.

At block 503, the controller 320 controls the pointing direction 115 of data capture component 113. Such control may occur by receipt of touch input at the touch display 117 when the thumb 205 interacts with the touch display 117 to select the pointing direction 115 of the data capture component 113, for example, using pull down menus, a graphic user interface (GUI), digital buttons, and the like, rendered at the touch display 117. As the front surface 119 of the touch display 117 is accessible to the thumb 205, such a selection may occur without the device 100 being removed from the hand 201.

At block 505, touch input is received at the touch display 117, and the touch input is conveyed to the controller 320. In the illustrated example, the touch display 117 renders a digital button, which may be touched by the thumb 205 to trigger the controller 320 to control the data capture component 113 to capture data.

At block 507, the controller 320, in response to receiving touch input from the touch display 117 at block 505, controls the data capture component 113 to initiate a data capture.

When data is captured by the data capture component 113, at block 509, the controller 320 controls one or more of the touch display 117, the speaker 125, and the electronic visual indicator 123, located at the proximal end 103, to indicate a successful data capture by the data capture component 113. In some implementations, block 509 occurs only when a format of the captured data meets one or more thresholds, for example, when the captured data is recognized as a barcode. Alternatively, when the format of the captured data does not meet the threshold(s) (e.g. when the captured data is not recognized as a barcode and/or does not meet a given barcode format), the controller 320 controls one or more of the touch display 117, the speaker 125, and the electronic visual indicator 123 to indicate an unsuccessful data capture by the data capture component 113. In some implementations, for each iteration of blocks 505, 507, the controller 320 controls one or more of the touch display 117, the speaker 125, and the electronic visual indicator 123 to indicate either a successful or unsuccessful data capture.

At block 511, the controller 320 stores data captured at block 507 at memory 322 and/or transmits the data to another device for storage, for example using the interface 324.

The example method 500 of FIG. 5 will now be described with reference to FIG. 6 through FIG. 10. The example method 500 of FIG. 5 will be described with reference to the device 100; while not all elements of the device 100 described heretofore will be referenced in each of FIG. 6 through FIG. 10, they are appreciated to be nonetheless present. It is further noted that the example method 500 of FIG. 5 will be described with reference to various GUIs, text and formats of digital buttons rendered at the touch display 117; however, such GUIs are examples only and different types of GUIs (including different text, different digital buttons and different formats) may be used without departing from the scope of the present specification.

Figure 6:
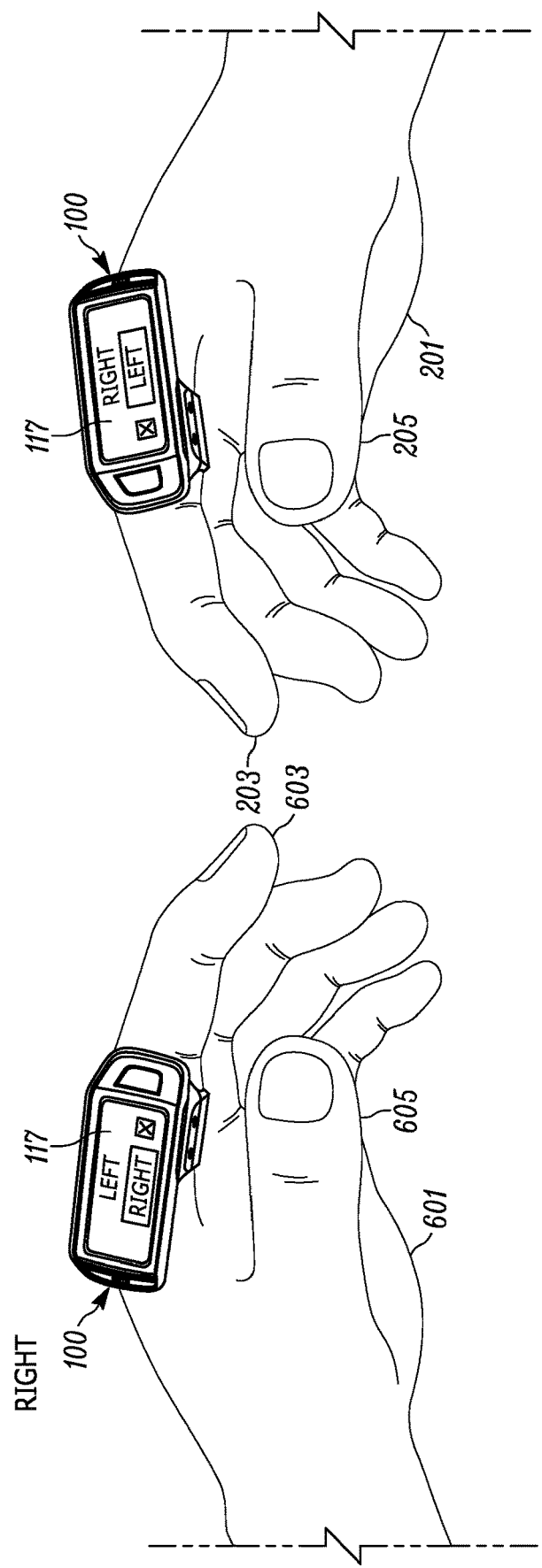
FIG. 6 depicts the example wearable device of FIG. 1 in a left-hand mode and a right-hand mode.

FIG. 6 depicts an example implementation of block 501. Specifically, FIG. 6 depicts the device 100 mounted on the index finger 203 of the right hand 201, similar to FIG. 3, and also mounted on a left hand 601, and specifically on an index finger 603 of the left hand 601 such that the front surface 119 of the touch display 117 is accessible to a thumb 605 (similar to FIG. 3 but for the left hand 601).

With reference to device 100 being mounted on the right hand 201, the device 100 is initially in a start-up mode, which may also include a right-hand mode, such that information (e.g. text and/or images) rendered at the touch display 117 are in an orientation readable by a user when the device 100 is mounted on their right hand. Specifically, the device 100 is being controlled to render text "RIGHT", indicating that the device 100 is currently in a right-hand mode, as well as a digital button labeled "LEFT" which, when touched by the thumb 205, or another body part, may cause the information rendered at the touch display 117 to rotate by 180°, for example into the orientation depicted when the device 100 is mounted on the left hand 601.

With reference to the device 100 being mounted on the left hand 601, the device 100 is initially in a left-hand mode, such that information (e.g. text and/or images) rendered at the touch display 117 are in an orientation readable by a user when the device 100 is mounted on their left hand. Specifically, the device 100 is being controlled to render text "LEFT", indicating that the device 100 is currently in a left-hand mode, as well as a digital button labeled "RIGHT" which, when touched by the thumb 205, or another body part, may cause the information rendered at the touch display 117 to rotate by 180°, for example into the orientation depicted when the device 100 is mounted on the left hand 201. In some examples, digital buttons "LEFT" and "RIGHT" are used to switch between the two orientations, for example at block 501.

Alternatively, a right-hand mode or a left-hand mode may be selected while the device 100 is not mounted on either of the hands 201, 601.

By selecting a right-hand mode or a left-hand mode, the device 100 can be used ambidextrously, which is further enabled by the physical configuration of the housing 101 having a suitable dimension (e.g., height), and by the housing 101 and the front surface 119 of the touch display 117 being symmetric about the longitudinal axis 107. In other words, regardless of whether the device 100 is worn on the left hand 601 or the right hand 201, the device 100 physically appears and feels similar to a user, and information rendered at the touch display 117 is orientated accordingly to be readable.

Figure 7:
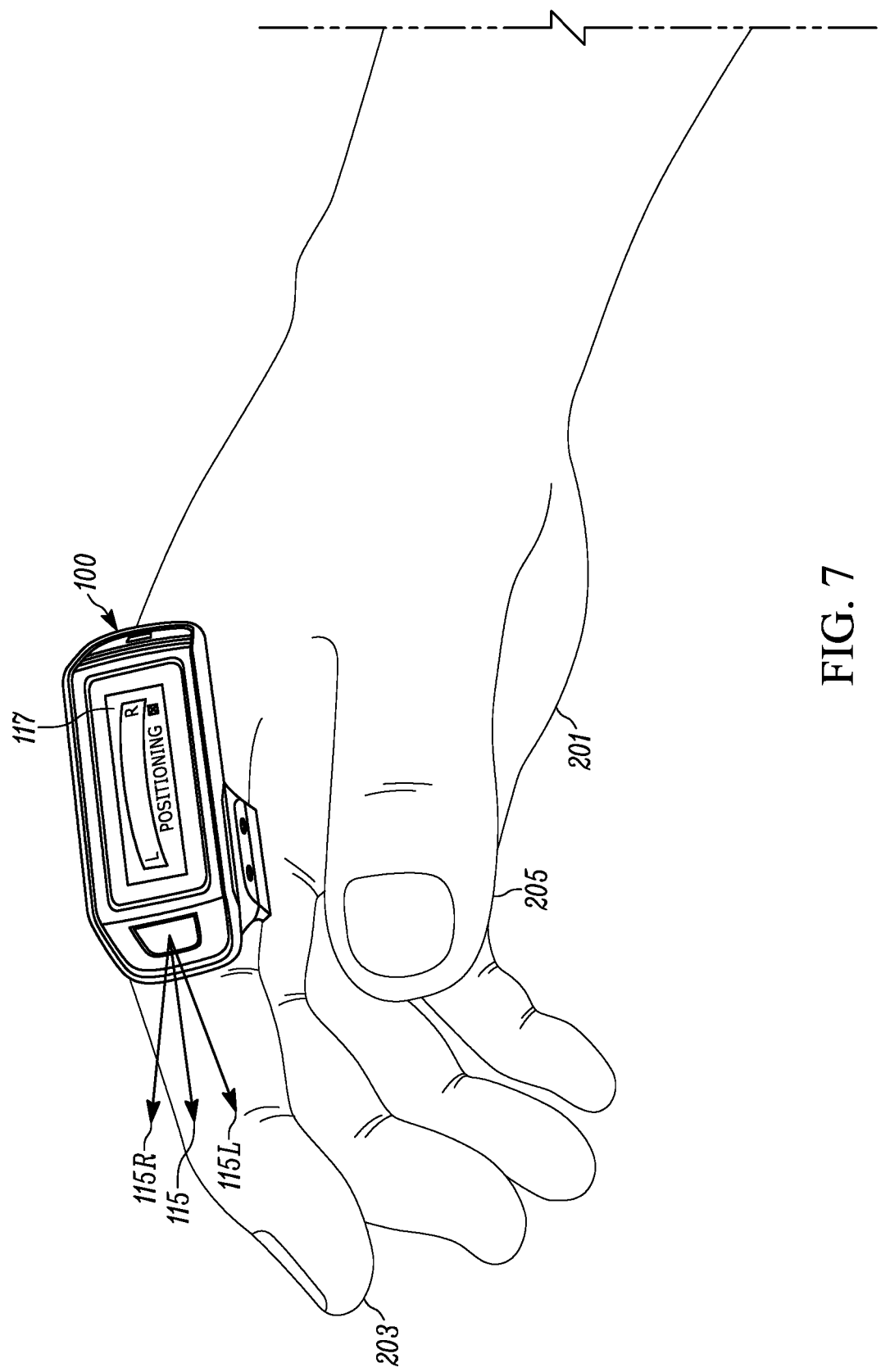
FIG. 7 depicts the example wearable device of FIG. 1 in a positioning mode.

Furthermore, in each of the orientations of the illustrated example, a digital button "X" is rendered, which, when selected, causes the controller 320 to proceed to a mode depicted in FIG. 7, which depicts an example implementation of block 503. In FIG. 7, the device 100 is in a right-hand mode, and the device 100 is mounted on the right hand 201. Furthermore, in FIG. 7, the touch display 117 is being controlled to render text "Positioning" indicating that the device 100 is in a data capture component positioning mode in which a position of the pointing direction 115 may be adjusted. In the example mode depicted in FIG. 7, the pointing direction 115 of the data capture component 113 is controllable (i.e., selectable). As such, in FIG. 7, the touch display 117 is controlled to render a digital button in an arcuate shape and labelled "LR" at which touch input can be received (e.g. when the thumb 205 interacts with the touch display 117). Receipt of touch input towards the "L" end of the digital button causes the pointing direction 115 to move in a first direction 115L, while receipt of touch input towards the "R" end of the digital button causes the pointing direction 115 to move in a second direction 115R. Movement of the pointing direction 115 may be indicated using further icons and/or graphics rendered at the touch display 117 (and alternatively using a moveable light (not depicted) located at the device 100).

In some implementations, the pointing direction is controlled to move at 90 degrees to a plane defined by the first and second directions 115L, 115R, for example, using a similar interface as that depicted in FIG. 7, which may be accessed using the digital button "X".

Such movement of the pointing direction 115 may be used to ergonomically position the pointing direction 115 for a given user.

Figure 8:
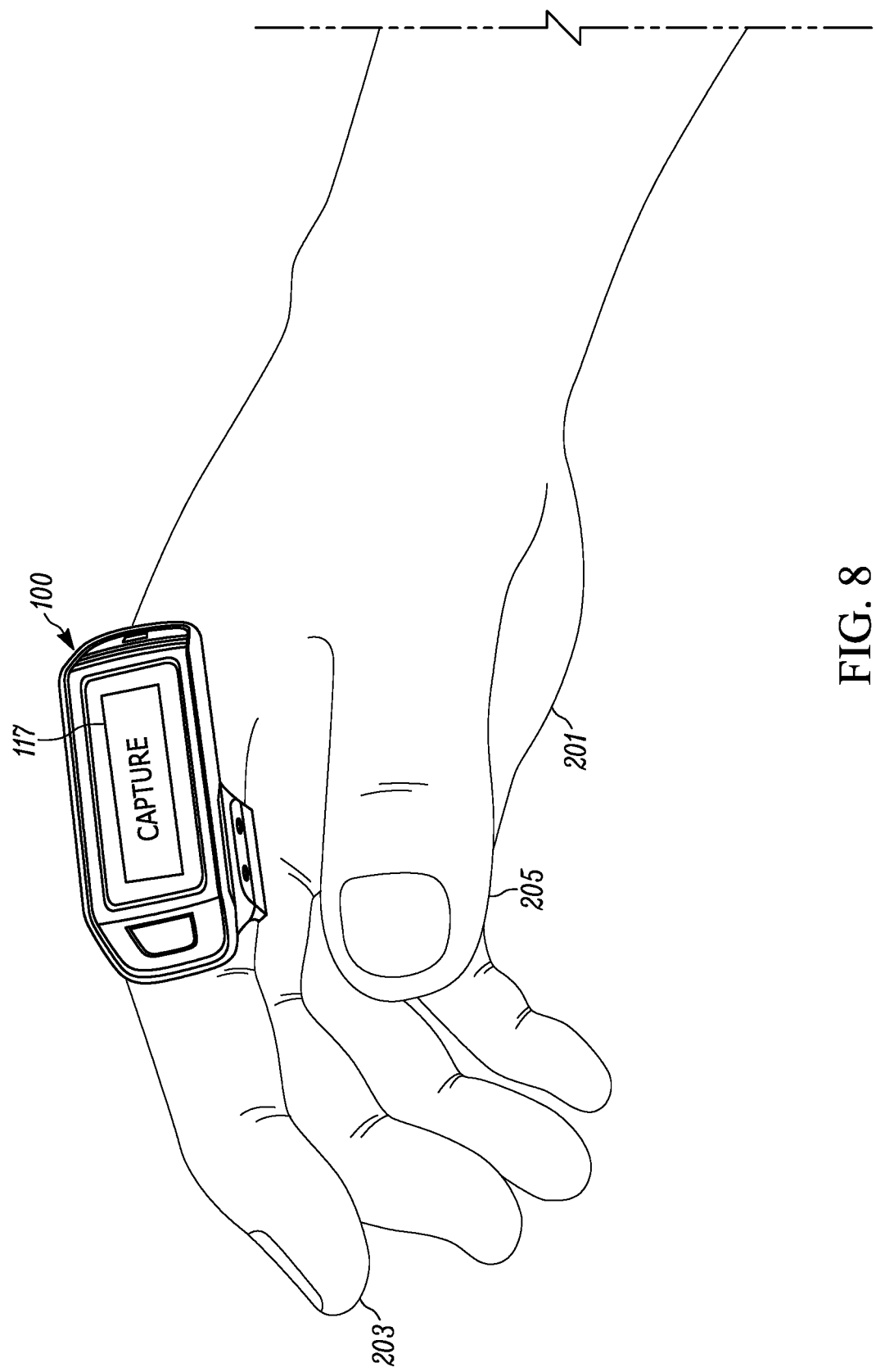
FIG. 8 depicts the example wearable device of FIG. 1 in a data capture mode.

In some examples, touch input received at digital button "X" causes the device 100 to enter a data capture mode, for example as depicted in FIG. 8. Alternatively, or additionally, the device 100 enters the data capture mode upon start-up, without the controller 320 implementing blocks 501, 503.

In FIG. 8, the touch display 117 is being controlled (e.g. by the controller 320) to render a digital button labelled "CAPTURE" which, when touch input is received at the digital button, causes the controller 320 to control the data capture component 113 to initiate a data capture operation.

Figure 9:
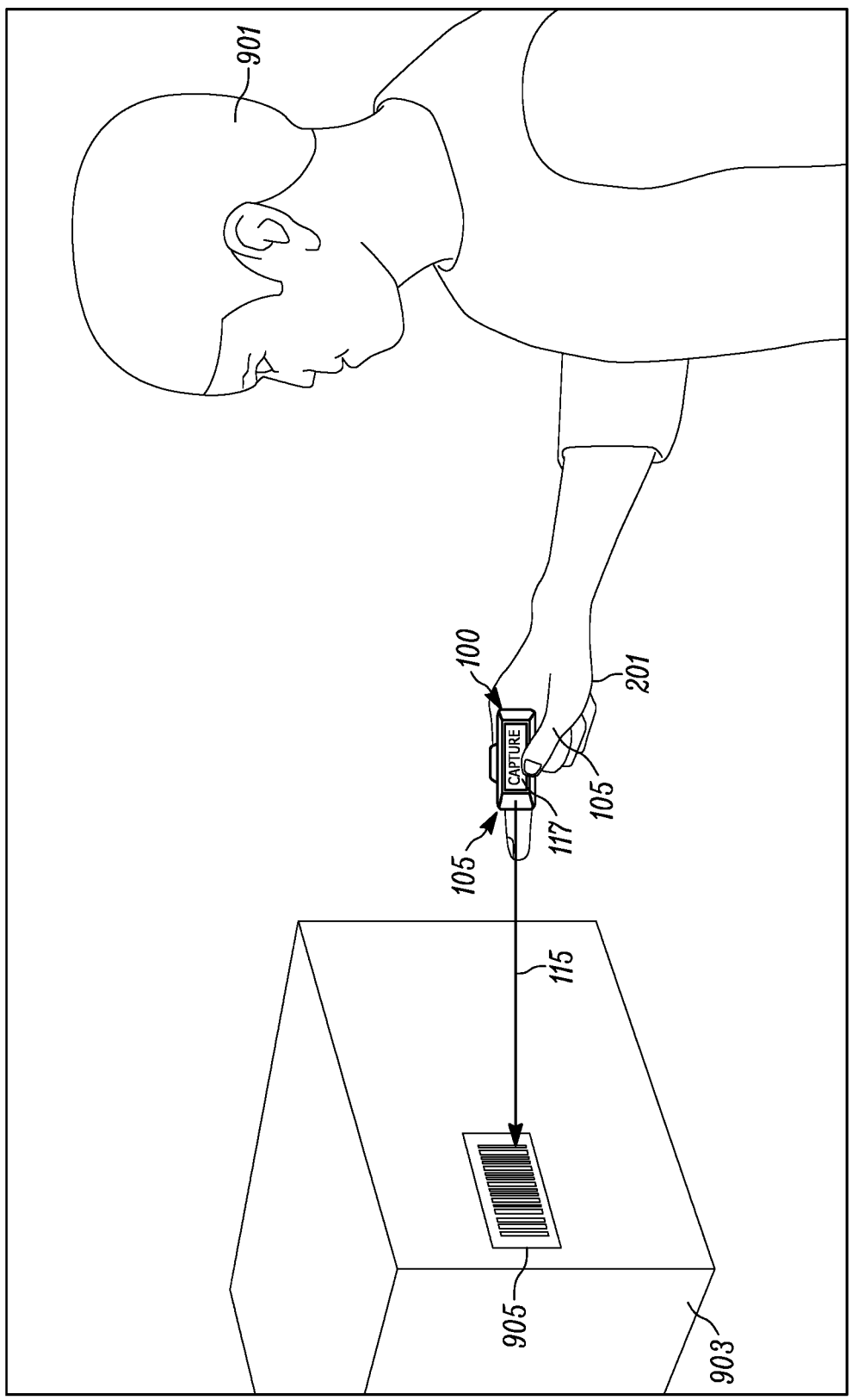
FIG. 9 depicts the example wearable device of FIG. 1 capturing data.

For example, attention is next directed to FIG. 9 which depicts a schematic diagram of the device 100 in use in the data capture mode. In particular, a head and eyes of a user 901 are depicted relative to the user's right hand 201 upon which is mounted the device 100 in data capture mode. The user views a box 903 upon which a barcode 905 has been placed (e.g., adhered to via a label or printed on). The user positions the right hand 201 such that the distal end 105 of the device 100 (and hence also the pointing direction 115) is pointing towards the barcode 905. Then the user moves the thumb 205 to touch the digital button labelled "CAPTURE" on the touch display 117 (e.g. at block 505). In response, (e.g. at block 507) the controller 320 controls the data capture component 113 to capture the barcode 905.

Figure 10:
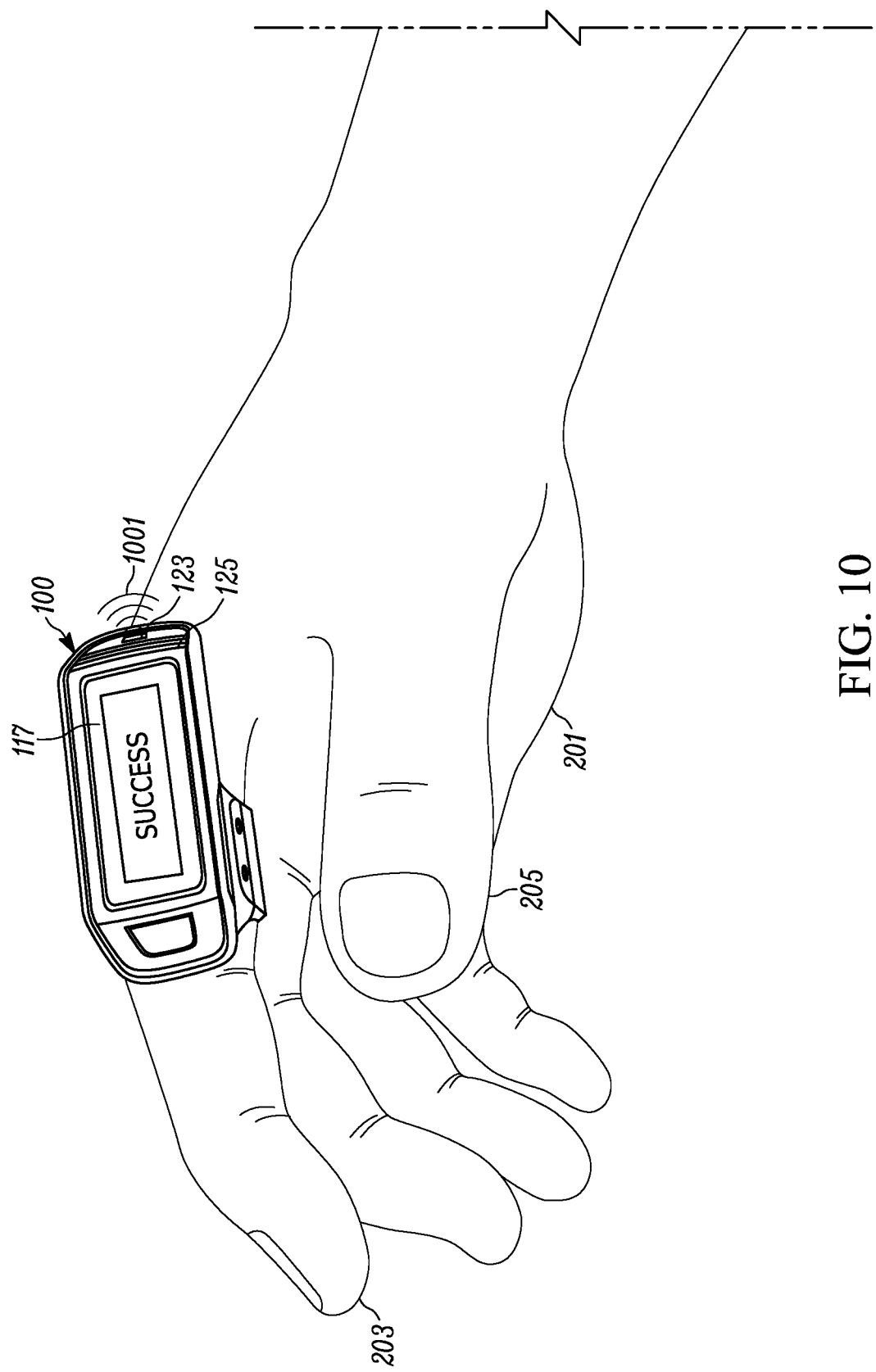
FIG. 10 depicts the example wearable device of FIG. 1 indicating a successful data capture.

With reference to FIG. 10, (e.g. at block 509), the controller 320 controls the touch display 117 to render text "SUCCESS!" indicating a successful data capture and/or controls one or more of the speaker 125 and the electronic visual indicator 123 to provide one or more indicators 1001 indicating a successful data capture (e.g. a tone and/or a light, and the like).

Figure 11:
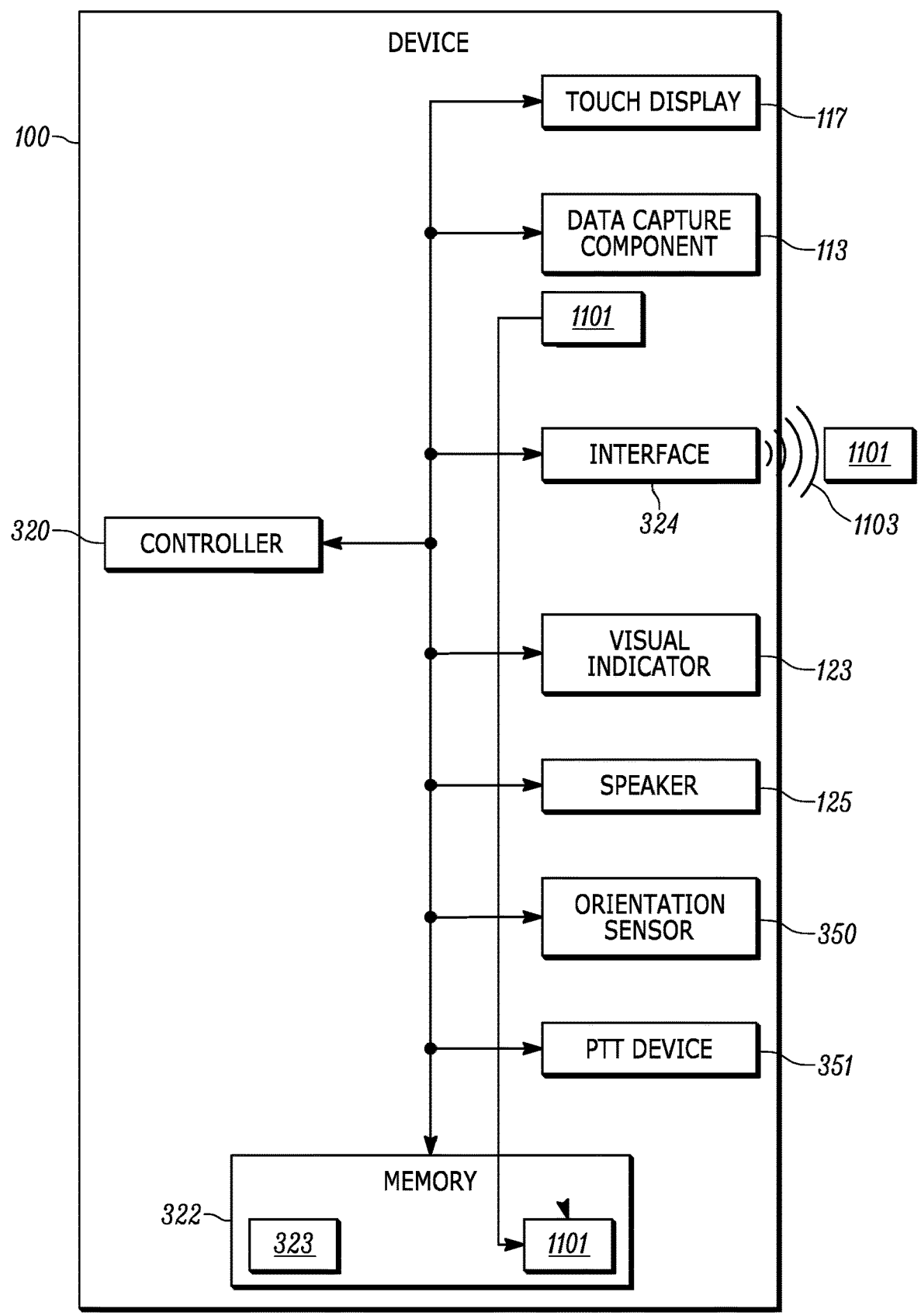
FIG. 11 depicts the example wearable device of FIG. 1 storing and transmitting captured data.

With reference to FIG. 11, (e.g. at block 511), data 1101 captured by the data capture component 113 is stored at the memory 322 (e.g. for later retrieval) and/or transmitted to another device (e.g. a warehousing server) using the interface 324, is indicated by transmission 1103 in FIG. 11.

Various modifications and changes may be made without departing from the scope of the specification. For example, while current implementations have been described with respect to the example device 100 including a data capture component 113, the present specification includes wearable devices having a similar physical configuration to the device 100, but not specifically including data capture and/or warehousing functionality. As such, present implementations include a device comprising: a proximal end, a distal end, and a longitudinal axis there between; a lateral axis perpendicular to the longitudinal axis, and a third axis perpendicular to each of the longitudinal axis and the lateral axis; a touch display, a front surface of the touch display extending along the longitudinal axis and the lateral axis, the third axis normal to the front surface; and a mounting device configured to mount the housing to a hand such that the touch display is accessible to a thumb of the hand. Hence, for example, a cell phone, a mobile computing device and the like, may be adapted to have a physical configuration similar to the device 100 such that the cell phone, mobile computing device and the like may be mounted on an index finger of a hand, as in FIG. 2 and/or FIG. 3. and operated using a thumb of the hand.

Figure 12:
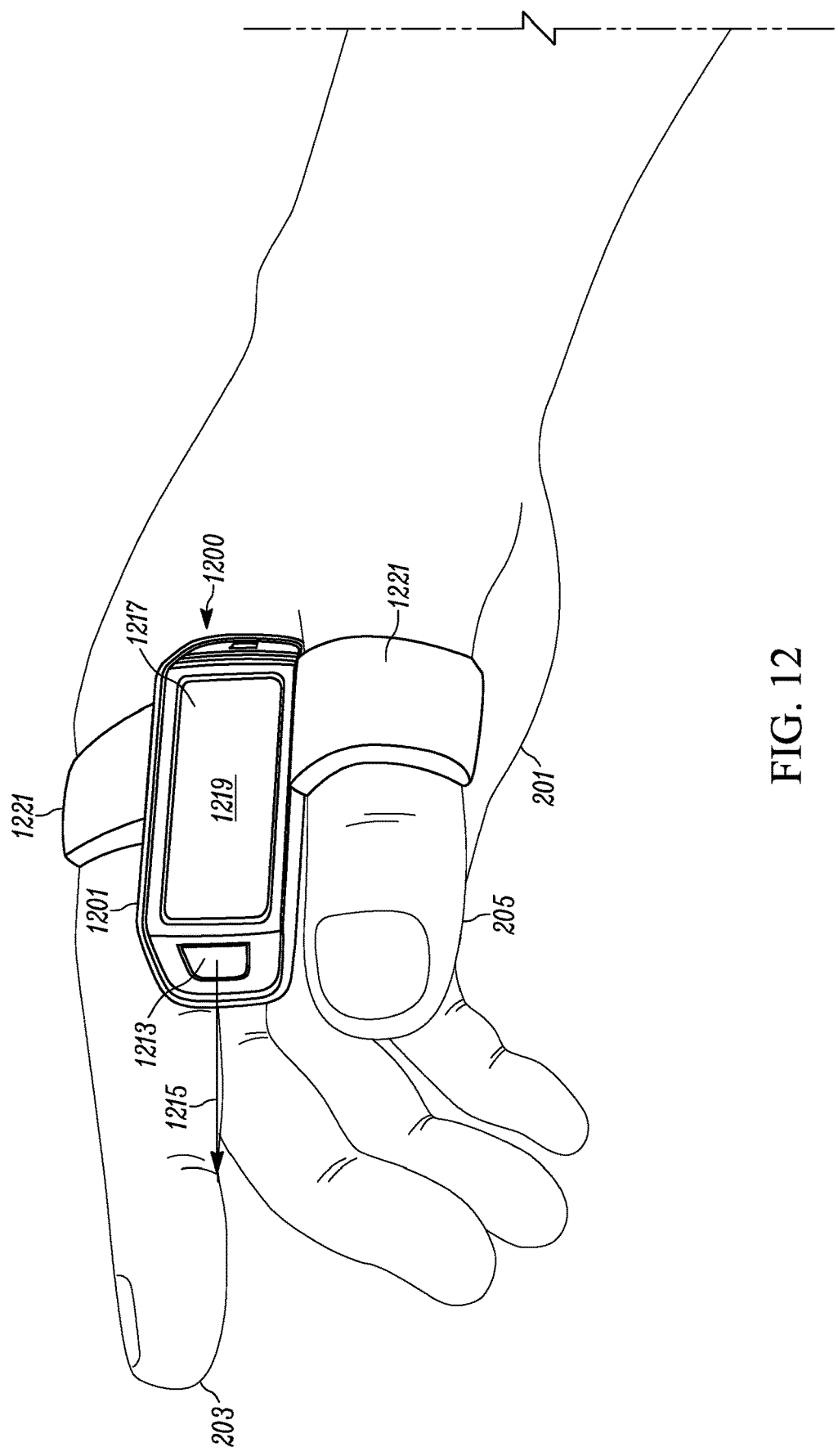
FIG. 12 depicts a wearable device that includes a webbing to mount the wearable device between an index finger and a thumb of a hand such that a touch display of the wearable device is accessible to the thumb.

Furthermore, other mounting devices are within the scope of present implementations. For example, FIG. 12 depicts an example device 1200 mounted to a hand 201. The example device 1200 of FIG. 12 is substantially similar to the example device 100 of FIG. 1, with like elements having like numbers, however in a "1200"series rather than a "100" series. However, rather than a ring, the example of FIG. 12 includes a mounting device 1221 having a webbing configured for attachment of a housing 1201 between an index finger 203 and a thumb 205 of the hand 201. A front surface 1219 of a touch display 1217 of the example device 1200 of FIG. 12 is accessible to the thumb 205, though movement of the thumb 205 towards the front surface 1219 of the touch display 1217 may also include the device 1200 moving towards a side of the index finger 203 (e.g. the thumb 205 may pin the device 1200 between itself and a side of the index finger 203 to interact with the device 1200). Furthermore, a pointing direction 1215 of a data capture component 1213 is in a similar direction relative to the index finger 203 as the example device 100 depicted in FIG. 3.

Figure 13:
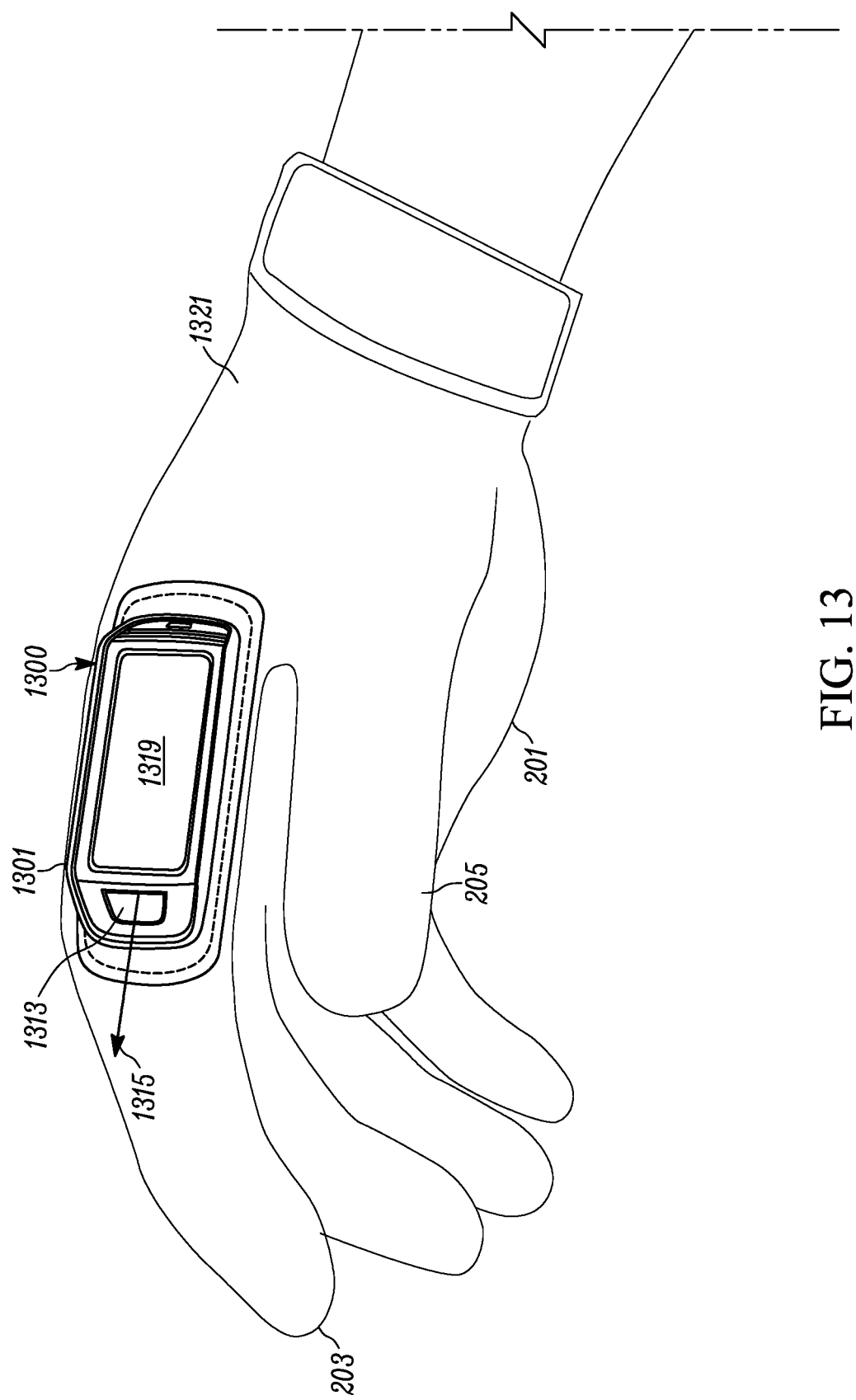
FIG. 13 depicts a wearable device that includes a glove to mount the wearable device between an index finger and a thumb of a hand such that a touch display of the wearable device is accessible to the thumb.

FIG. 13 depicts an example device 1300 mounted to a hand 201. The example device 1300 of FIG. 13 is substantially similar to the device 100 of FIG. 1, however in a "1300" series rather than a "100" series. Rather than a ring, the example of FIG. 13 includes a mounting device 1321 having a glove with a housing 1301 of the device 1300 mounted to a same position of the glove relative to the device 100 mounted to the index finger 203 of the hand 201, depicted in FIG. 2 and FIG. 3. A user may put on the glove and the housing 1301 will be positioned such that a front surface 1319 of a touch display 1317 of the device 1200 is accessible to a thumb 205. As such, a portion of the glove that corresponds to a surface of the thumb 205 that touches the front surface 1319 of the touch display 1317 may be configured to provide touch input to the touch display 1317. For example, such a portion may be conductive to interact with a capacitive touch display. Furthermore, a pointing direction 1315 of a data capture component 1313 is in a similar direction relative to the index finger 203 as the example device 100 depicted in FIG. 3.

Figure 14:
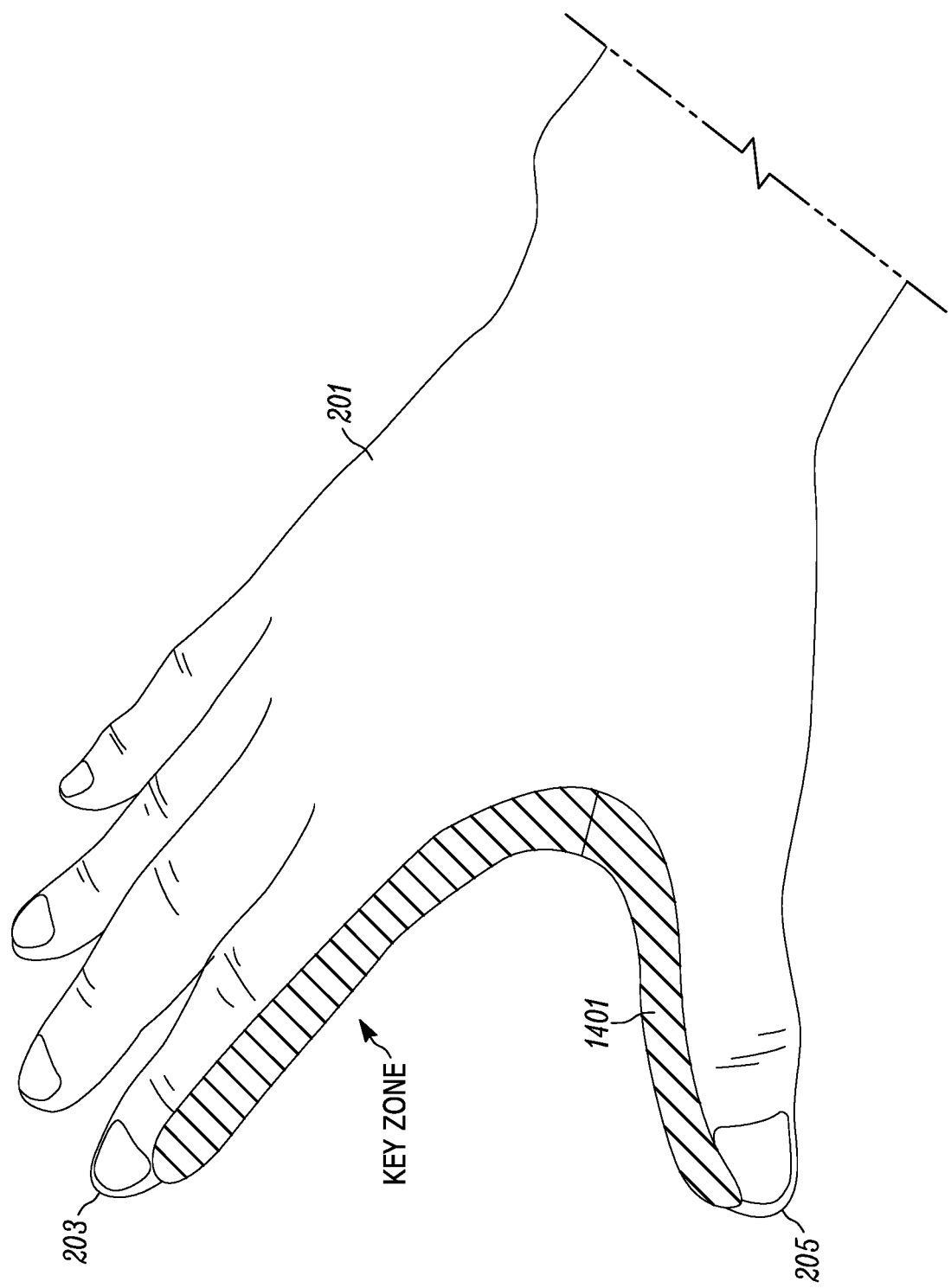
FIG. 14 depicts regions of a hand to which wearable devices of the present specification may be located.

FIG. 14, which depicts a hand 201 when extended, demonstrates that example devices disclosed herein are compatible or usable with any suitable mounting device that mounts the device (e.g., the example device 100 of FIG. 1), or similar, to a region of a hand that extends from a tip of an index finger 203 to a base of the index finger 203 between the index finger 203 and a thumb 205, and where a touch display (e.g., the touch display 117 of the example device 100 of FIG. 1) is accessible to the thumb 205. In FIG. 14, this region is labeled as "KEY ZONE" and is shaded. As depicted in FIG. 14, also shaded is a region 1401 of the thumb 205 that is generally used to access a touch display (e.g., the example touch display 117 of FIG. 1).

The example devices disclosed herein may be removable from one or more mounting devices. For example, with reference to the example of FIG. 1, the housing 101 may be removable from the ring of the mounting device 121. With reference to the example of FIG. 12, the housing 1201 may be removable from the webbing of the mounting device 1221. With reference to the example of FIG. 13, the housing 1301 may be removable from the webbing of the mounting device 1321. Hence, for example, in warehouse environment, and the like, a worker may be issued a personal mounting device, such as a ring, webbing, a glove, and the like, and during a shift attach one of a plurality of devices (e.g. device 100 without mounting device 121) to the personal mounting device for use during the shift. At the end of the shift, the device may be removed from the personal mounting device and recharged for use by a next worker, and the personal mounting device may be cleaned. Hence, some implementations disclosed herein include a mount device and/or quick mount device configured to removably attach devices disclosed herein to a personal mounting device which may render devices disclosed herein hygienic and further enable such devices to be passed from user to user without need for immediate cleaning.

Figure 15:
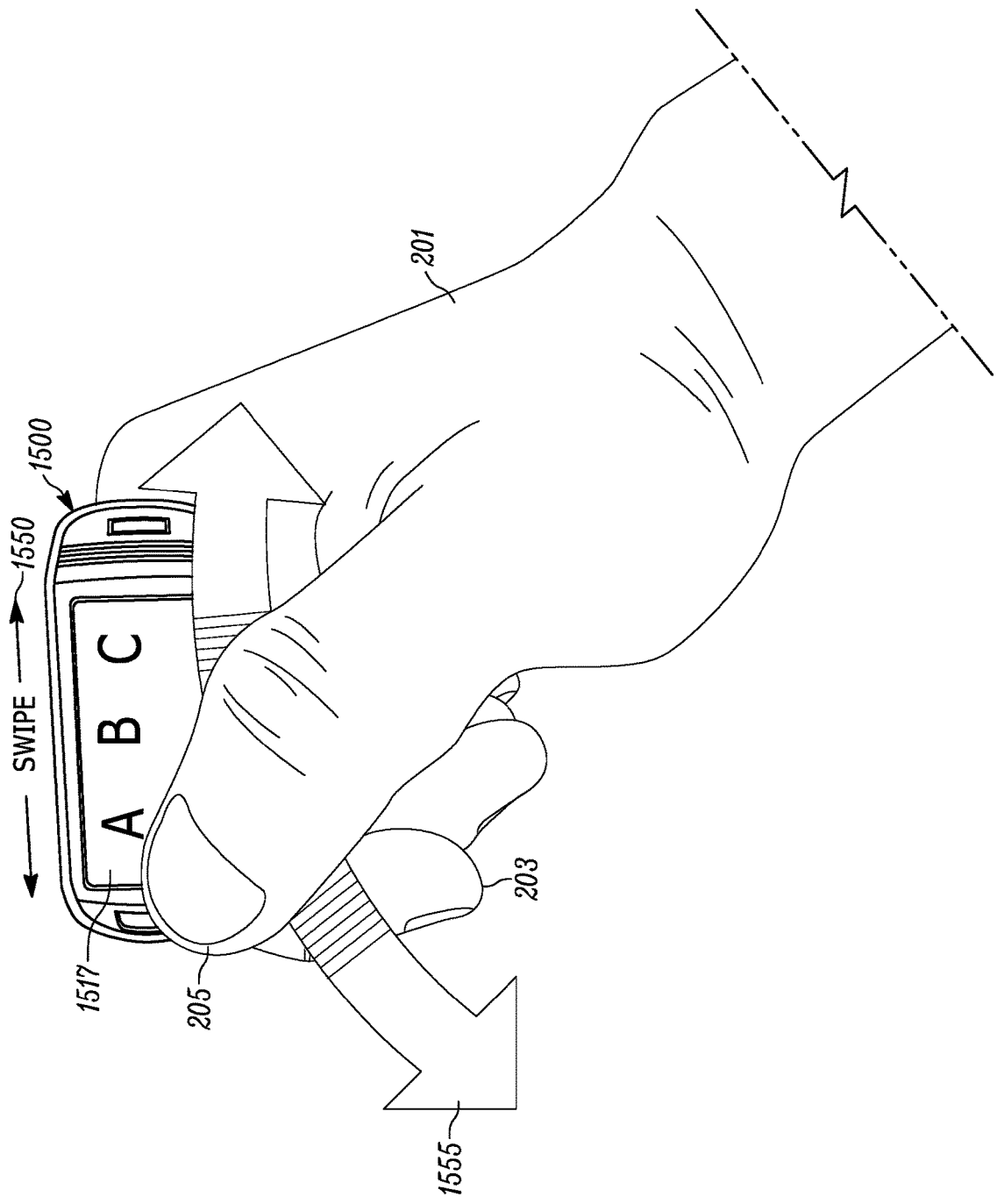
FIG. 15 depicts a horizontal menu structure suitable for interaction with a thumb.

FIG. 15, which depicts an example device 1500 similar to one or more of the example devices 100, 1200, 1300, mounted to a hand 201, with like components having like numbers, however in a "1500" series. The example device 1500 is mountable to a side of an index finger 203, such that a touch display 1517 of the device 1500 is accessible a to thumb 205. In the illustrated example of FIG. 15, the device 1500 implements a horizontal menu structure suitable for interaction with the thumb 205 when the device 1500 is mounted to a side of the index finger 203 of the hand 201. The example horizontal menu structure of FIG. 15 extends along a longitudinal length of the touch display 1517, and is accessible using, for example, touch gestures and/or swipe gestures 1550 using a natural movement of the thumb 205, as indicated by arrow 1555 in FIG. 15. As such, the example horizontal menu structure of FIG. 15 includes GUI components corresponding to portions of the touch display 1517 that are, for example, finger width and/or thumb width. Additionally, a length of the touch display 1517, and hence the example horizontal menu structure of FIG. 15 is half a length of the index finger 203 as defined, for example, using human factors studies that define an average length of a human index finger. Such a horizontal menu structure allows for ergonomic thumb scrolling and activation press with the thumb 205 such that the device 1500 is configured for one-handed operation.

Figure 16:
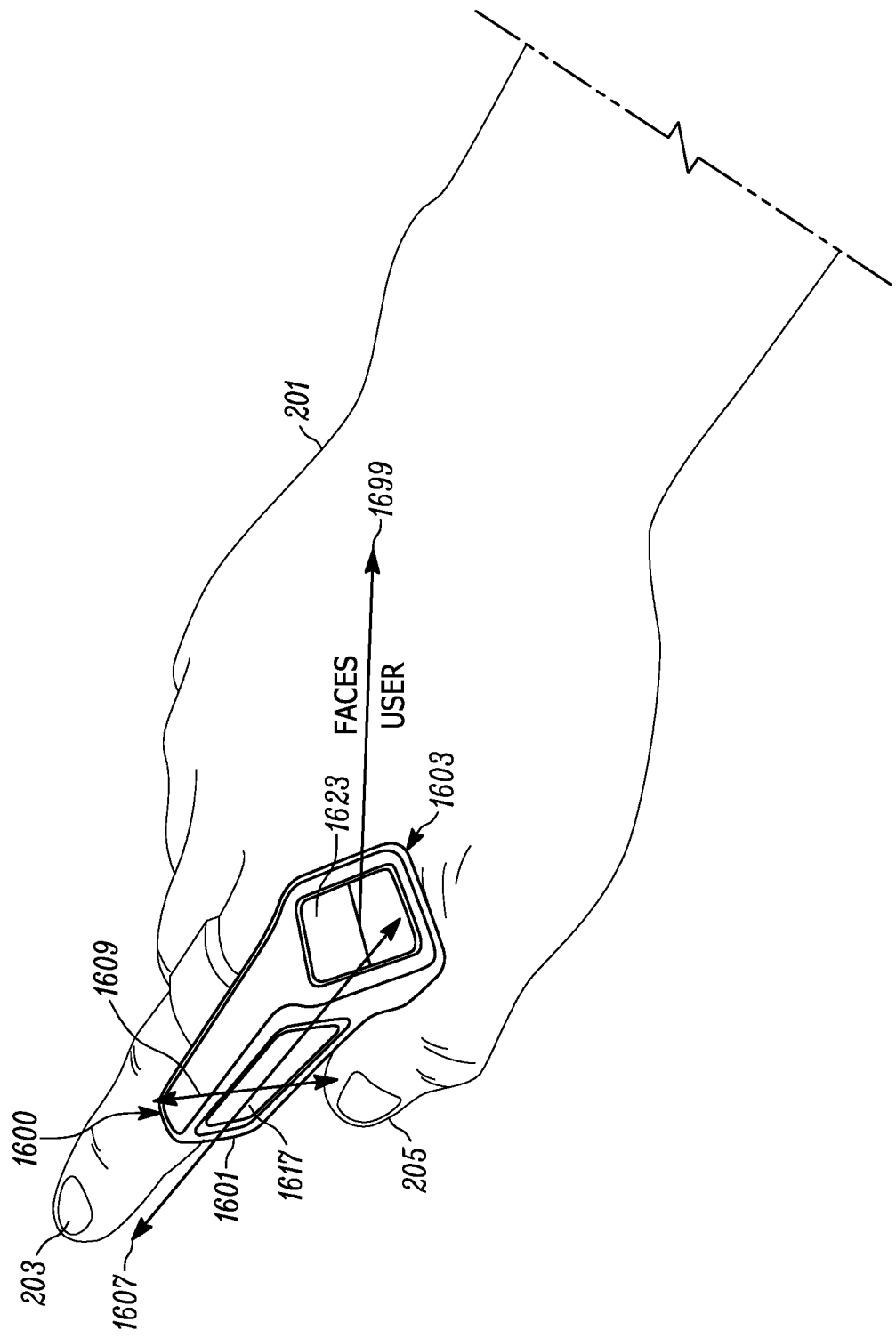
FIG. 16 depicts a wearable device that includes a ring to mount the wearable device to an index finger of hand such that a touch display of the wearable device is accessible to a thumb of the hand, the wearable device including a display at a proximal end.

FIG. 16 depicts an example device 1600 mounted to an index finger 203 of a hand 201 such that a touch display 1617 is accessible to a thumb 205. The example device 1600 of FIG. 16 is similar to one or more of the devices 100, 1200, 1300, 1500, with like components having like numbers, however in a "1600" series. In the example device 1600 of FIG. 16, an electronic visual indicator 1623, located at a proximal end 1603 of the device 1600, comprises a display rather than a simple light and/or LED. Furthermore, as depicted, a normal 1699 of the display of the electronic visual indicator 1623 is in a same plane defined by a longitudinal axis 1607 and a lateral axis 1609 of the device 1600, but at a respective angle to each of the longitudinal axis 1607 and the lateral axis 1609, such that when the device 1600 is mounted on an index finger 203, the display of the electronic visual indicator 1623 faces eyes of a user when the hand 201 is pointed away from the eyes of the user. In particular, the display of the example electronic visual indicator 1623 of FIG. 16 is perpendicular to a user's angle of view. In some examples, the display of the electronic visual indicator 1623 includes a touch display and information and/or a menu system are rendered thereupon for viewing by a user and/or to receive touch input from a user. In some examples, the display of the electronic visual indicator 1623 is controlled by a controller of the device 1600 to provide an indication of a successful data capture (assuming device 1600 includes a data capture component and is executing, for example, the method 500 of FIG. 5).

In some implementations, the display of the electronic visual indicator 1623 extends at least partially along a back of the hand 201. Put another way, a housing 1601 of the example device 1600 of FIG. 16 is angled at the proximal end 1603. As such, information on the display of the electronic visual indicator 1623 is rendered with an orientation suitable for viewing by the user (e.g. in a similar orientation as information rendered at the touch display 1617). Furthermore, in some implementations, device 1600 is not necessarily symmetrical about the longitudinal axis 1607 and hence can be specifically configured for use at a right hand. Alternatively, the example device 1600 of FIG. 16 can be adapted for use by a left hand by altering a configuration of the housing 1601.

In some implementations, the display of the electronic visual indicator 1623 is replaced with a light and/or an LED, but with the housing 1601 having an otherwise similar physical configuration.

Figure 17:
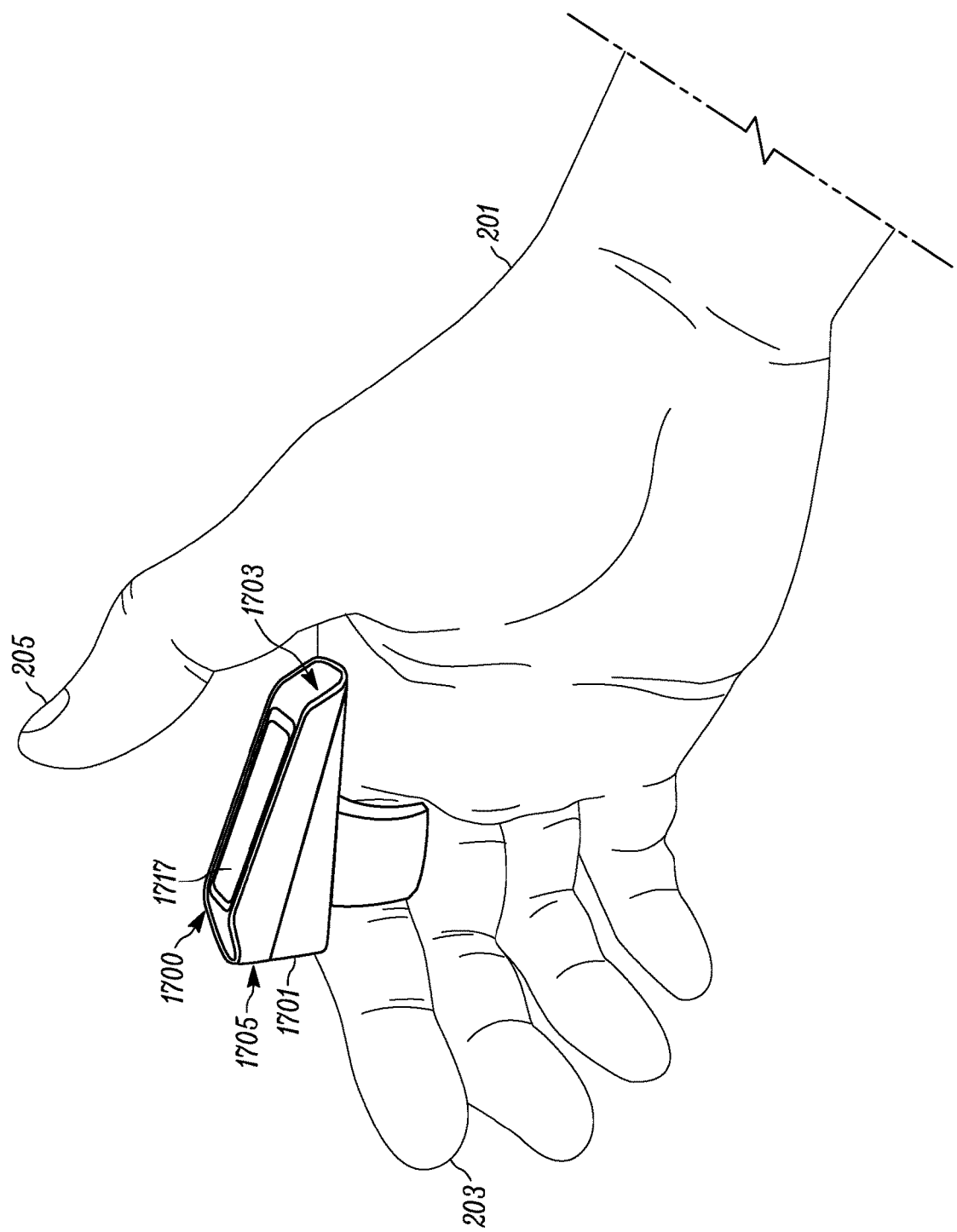
FIG. 17 depicts a wearable device that includes a ring to mount the wearable device to an index finger of hand such that a raised touch display of the wearable device is accessible to a thumb of the hand.

FIG. 17 depicts an example device 1700 mounted to an index finger 203 of a hand 201 such that a touch display 1717 is accessible to a thumb 205. The example device 1700 of FIG. 17 is similar to one or more of devices 100, 1200, 1300, 1500, 1700, with like components having like numbers, however in a "1700" series. However, in the example device 1700 of FIG. 17, a housing 1701 of the device 1700 is higher at a distal end 1705 than at a proximal end 1703 such that a touch display 1717 is angled towards a user when the device 1700 is mounted to the hand 201 and/or when the hand 201 is extended sideways from the user. Such an arrangement is more ergonomically convenient.

In some implementations, the device 1700 includes an apparatus for adjusting the angle of the touch display 1717.

In some of these implementations, the touch display 171 is mounted on a gimbal, a pivot, and the like, which is attached to the housing 1701, so that the angle of the touch display 1717 is adjustable by placing pressure on the touch display 17171 to cause the touch display 1717 to rotate with respect to the housing 1701 using the gimbal, the pivot and the like.

Figure 18:
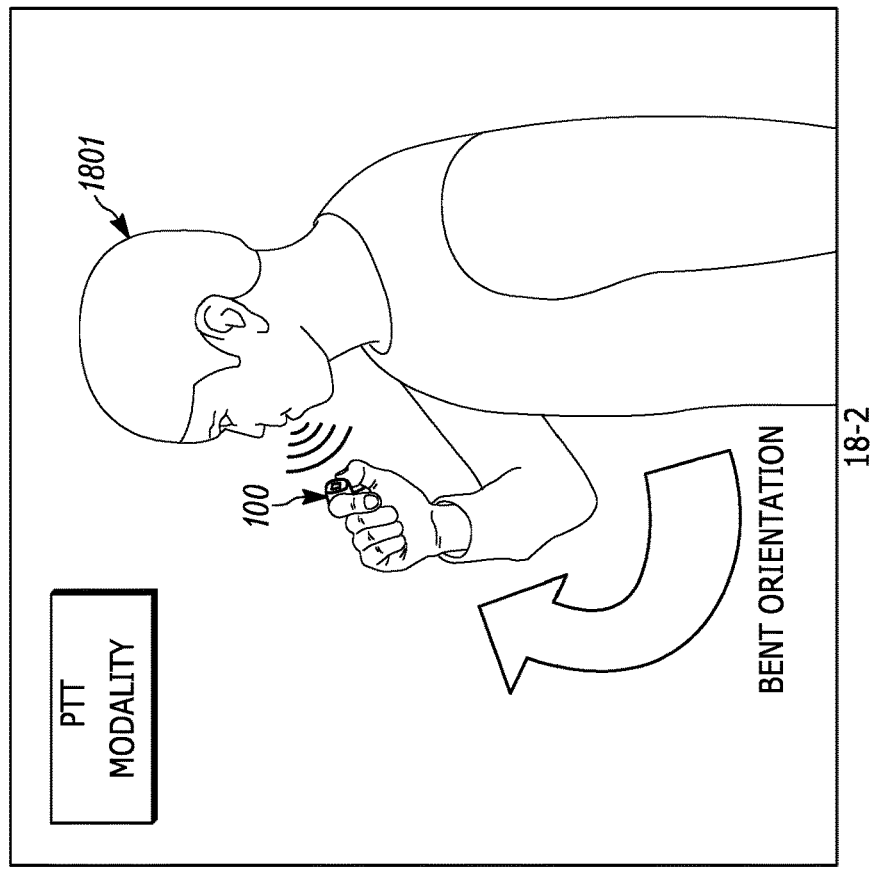
FIG. 18 depicts the example wearable device of FIG. 1 being controlled into different modes based on orientation.
Figure 18:
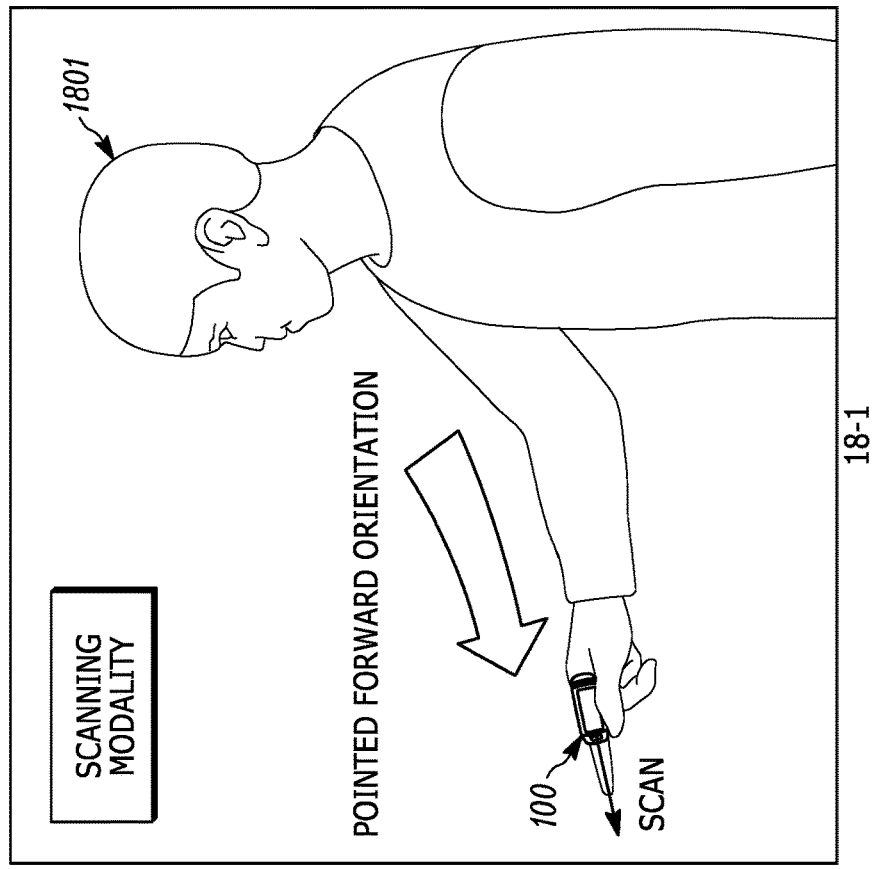

FIG. 18 depicts a sequence of views 18-I, 18-II of the device 100 in use with a user 1801, assuming device 100 is mounted on a hand of the user. In the example of FIG. 18, the device 100 includes the orientation sensor 350 the PTT device 351 of FIG. 3. In view 184, a hand of the user 1801 is pointed forward and/or away from the user 1801. When pointed forward and/or away from the user 1801, the controller 320 of the device 100 executes the method 500 of FIG. 5 and the device 100 functions as described above. Put another way, when pointed forward and/or away from the user 1801, the controller 320 controls the device 100 to enter one or more of "scanning modality" and/or a data capture mode.

In view 18-II, the user 1801 has bent an arm such that the device 100 is adjacent a mouth of the user 1801. The orientation sensor 350 senses such an orientation and/or such a change in orientation and communicates orientation data to the controller 320 to indicate such an orientation and/or such a change in orientation. In response, the controller 320 stops executing the method 500 of FIG. 5 controls the PTT device 351 to an "on" mode and/or a "use" mode, such that the PTT device 351 may be used to communicate with other communication devices (not depicted). Put another way, in these orientations, the controller 320 controls the device 100 to enter one or more of "PTT modality" and/or a PTT mode.

In the example of FIG. 18, when the user 1801 moves the device 100 back to the orientation of view 18-I, the orientation sensor 350 communicates orientation data to the controller 320 to indicate such an orientation and/or such a change in orientation, and the controller 320 controls the device 100 to enter the data capture mode by, for example, turning the PTT device 351 off and/or into standby mode and executing the method 500 of FIG. 5.

FIG. 18 further illustrates that the orientation sensor 350 may be used to detect gestures at the device 100. In some implementations, the memory 322 stores a gesture library (e.g. which may be stored as a module of application 323) which may include "multi-modal" actions detectable at the device 100, which may be relevant to context of, for example, a user workflow. For example, the gesture library may include a database, and the like, of given input that may be received at the device 100 (e.g., a combination of given input and/or given touch input and/or orientation sensor data, and an associated action). When the received input is detected by components of the device 100 (e.g. the touch display 117 and/or the orientation sensor 350 and/or a microphone), the controller 320 executes the associated action. Hence, from a user perspective, a user may take a specific action that corresponds to the given touch input to cause the device 100 to perform the associated (e.g., as defined in the database) action. For example, a given touch input (e.g. a given press and hold action or a double tap action) may be performed in combination with a given arm movement to initiate a command, such as changing a modality of the device 100, as depicted in FIG. 18 and/or changing a configuration of a GUI rendered at the touch display 117 (e.g. when the device 100 enters one or the other of the modes depicted in views 18-I, 18-II, the controller 320 may control the touch display 117 to render associated GUIs.).

While the gestures of the modes of FIG. 18 have been described with respect to a data capture mode and a PTT mode, other modes are within the scope of present implementations. For example, when the device 100 includes a cell phone radio, rather than a PTT mode, the device 100 may be controlled to a cell phone mode in view 18-II, with voice input received at the speaker 125 causing initiation of a call.

In some examples, gestures switch an example device disclosed herein to a voice mode, regardless of whether the device includes a data capture component. For example, the example device 100 of FIG. 1 may be switched to a voice mode when a user provides touch input to the touch display 117 while raising the device 100 to a mouth of the user. In some examples, a combination of such a discrete action (as detected using touch input received at the touch display 117) and a gesture (as detected by the orientation sensor 350) causes the device 100 to switch to (and/or enter) a voice mode. In a warehousing and/or work environment, when a user requires assistance, the user may raise an arm vertically (e.g. over their head), and, in response, the controller 320 of the device 100 attached to their hand enters, for example, an assistance mode (e.g. when the orientation sensor 350 senses the vertical motion and/or vertical orientation) and further transmit an assistance message to another device (e.g. a device located in the warehousing and/or work environment). in warehousing environment, if a user reaches forward (e.g. as detected by the orientation sensor 350), a scanning and/or data capture action is initiated, for example, without receipt of touch input at the device 100. Such an action may occur when the user is reaching towards a pick bay and/or item location with one of the device 100 mounted on their hand.

Figure 19:
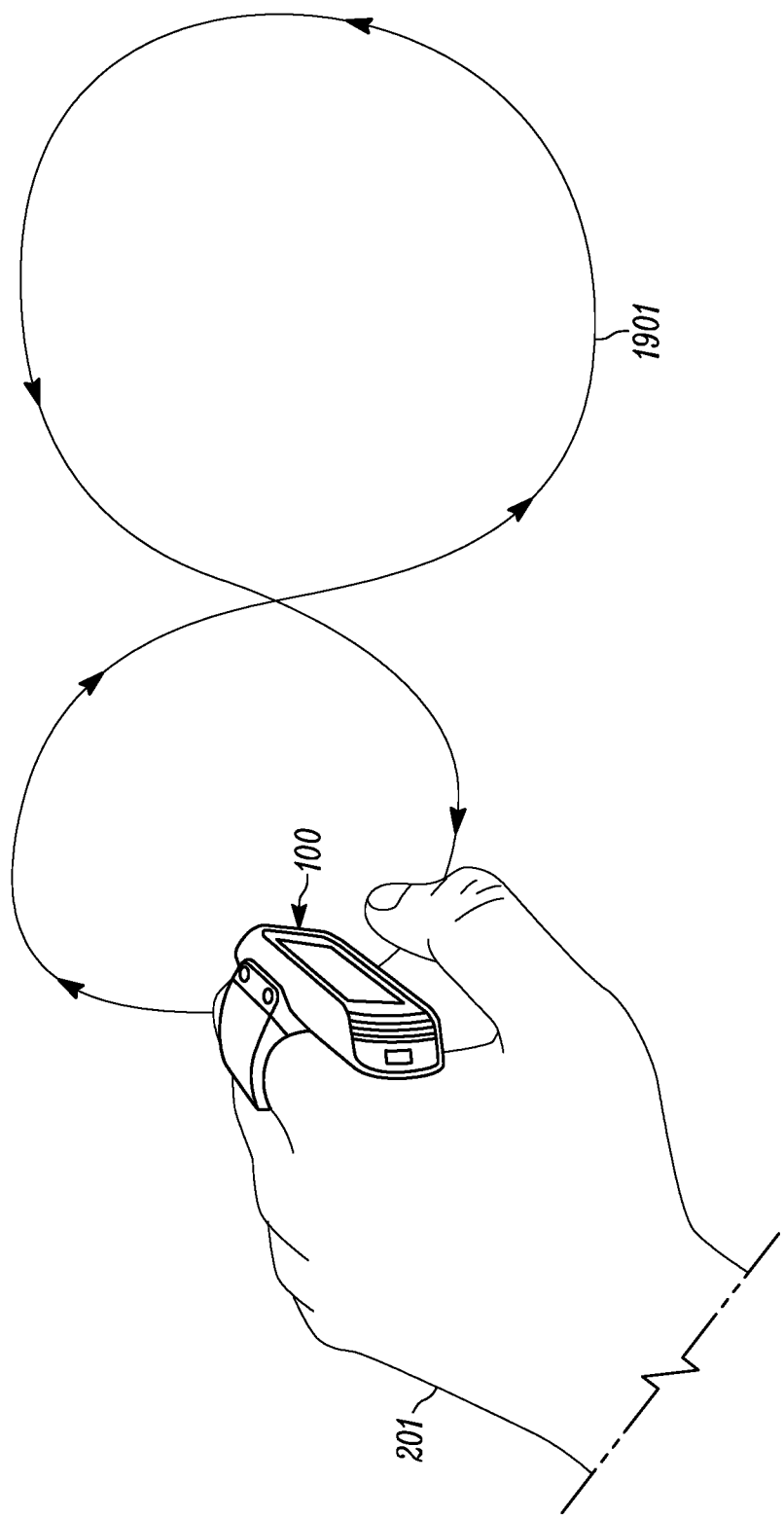
FIG. 19 depicts an example gesture detectable by an orientation sensor of the example wearable device of FIG. 1.

FIG. 19 depicts an example gesture 1901 detectable by, for example, the orientation sensor 350 with the device 100 mounted to a hand 201. For example, the gesture 1901 comprises a "figure eight" gesture which, when detected by the orientations sensor 350, causes the device 100 to enter an unlocked mode, assuming the device 100 was in a lock mode when the gesture 1901 was detected. Alternatively, the example gesture 1901, when detected by the orientation sensor 350 causes the device 100 to enter the locked mode, assuming the device 100 was in the unlocked mode when the gesture 1901 was detected. Notably, the gesture 1901 is detected by the example device 100 without associated touch input. Additionally, or alternatively, a distinctive gesture may be used as a user identification and/or log-in to the device 100.

Figure 20:
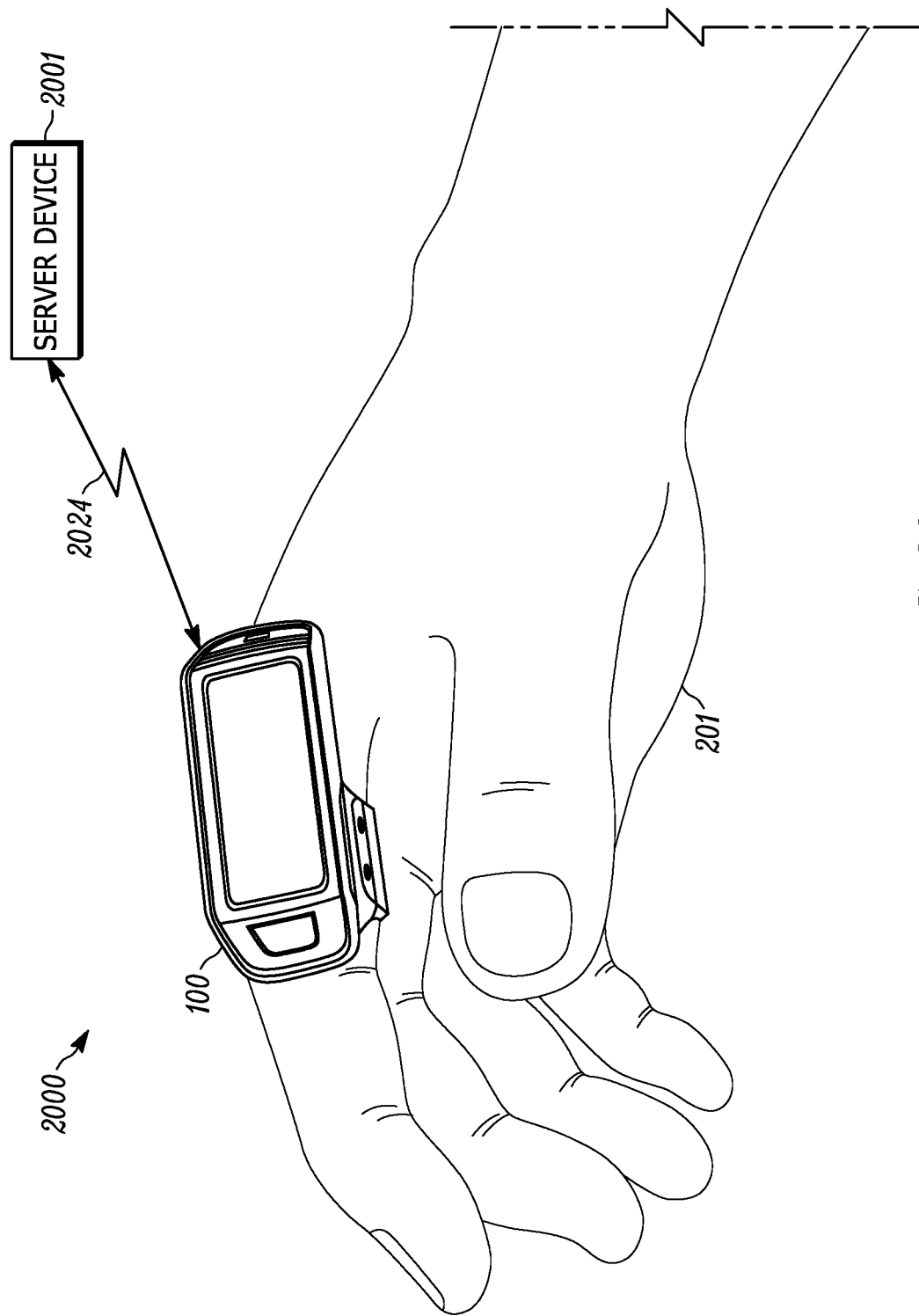
FIG. 20 depicts a system that includes the wearable device of FIG. 1 in communication with a server device.

In some examples, the orientation sensor 350 is used for gesture tracking and/or body motion tracking at devices other than device 100. For example, FIG. 20 depicts an example system 2000 that includes the example device 100 mounted to the hand 201, and a server device 2001, in communication via a communication link 2024 (e.g., a communication network or a local communication network) via, for example, the interface 324 and a similar communication interface at the server device 2001. The server device 2001 is implemented by any suitable server device that can communicate with the device 100 and/or other electronic devices. While not depicted, the example server device 2001 of FIG. 20 includes controllers and/or processor and/or memory and/or any other components for implementing the specific functionality of the server device 2001.

In the illustrated example of FIG. 20, orientation data is transmitted from the device 100, using the interface 324, to the server device 2001. In some example implementations, the orientation data is used to identify a user's physical attributes such that the server device 2001 may allocate tasks to different users based on their determined physical attributes (e.g. which user might be best suited for a particular task such as lifting heavy containers based, for example, upon stored user profiles at the server 2001 (and/or at a memory accessible to the server 2001), the stored user profiles indicating predetermined physical capabilities of a user including, but is not limited to, predetermined left-handedness, predetermined right-handedness, predetermined user reach, predetermined user lift height, and the like).

In some example implementations, the server device 2001 of FIG. 20 is configured to identify whether a user person is holding a box, grabbing a steering wheel and/or lifting other items based on the orientation of a hand and its movement. For example, in some of these implementations, the device 100 includes an orientation determining device (including, but not limited to, a a 6-axis accelerometer sensor) and hence the device 100 determines hand and/or device orientation data. Such orientation data is used in combination with stored motion profiles (e.g. predetermined motion profiles stored at the device 100 and/or at server device 2001 and which are associated with various motions) to determine whether a box is being carried, pushed down a conveyor belt, and the like. Indeed, in some example implementations, such predetermined motion profiles distinctly characterize motions and/or movements used in a warehousing environment, though any predetermined motion profiles are within the scope of present implementations.

In some example implementations, the example server device 2001 of FIG. 20 detects the motion of pushing a box along a conveyor during a sortation workflow, which, in turn, triggers a count. In these example implementations, the example server device 2001 of FIG. 20 hence tracks movement and gestures identifying good and bad motions. In some of these implementations, the example server device 2001 tracks movement for training and/or health and safety compliance, based on given thresholds and/or given data stored in a memory accessible to the server device 2001. Such movement can again be tracked based on predetermined motion profiles.

In some example implementations, the example server device 2001 of FIG. 20 identifies a known location based on, for example, GPS data and/or a radio frequency locating system, and determines a next task that is to occur. In some example implementations, the example server device 2001 determines a next task to occur using dynamic triangulation, and the like, between three or more fixed infrastructure beacons and/or sensors (e.g. Bluetooth™, WiFi, ultrasonic and/or other sensors) within an environment where the device 100 is located (e.g. a warehouse) to locate the device 100 and matches a location to a predetermine profile associated with a task. Furthermore, in some example implementations, the example server device 2001 determines a next task to occur using configured to use Time of Flight (ToF) techniques, machine vision sensing techniques, and the like to determine a delta-variance in movement of the device 100 (e.g. from one moment to the next) and such a delta-variance in movement is matched to a predetermine profile associated with a task.

In some example implementations, the server device 2001 transmits instructions to the device 100 for implementing the next task, which may provide more efficient allocation of resources and efficiency in the workplace, as well as generate recommendations to improve to process and training. In some example implementations instructions received at the device 100 from the server device 2001 are rendered at a display of the device 100, for example touch display 117

(and/or a display at the proximal end, and the like). In some implementations where two or more displays are present at the device 100, the device 100 is configured to render the instructions at a display that is most visible to a user based, for example, on orientation data from an orientation sensor.

In some example implementations, the example server device 2001 of FIG. 20 is configured to process orientation data received from the device 100 to detect a drop or a fall by the user (e.g. the user may be injured) and transmit alerts and/or dispatch an emergency team to the user. In some of these example implementations, such a detection is achieved by comparing the received orientation data with stored predetermined orientation profiles and/or stored predetermined motion profiles associated with a user falling and/or dropping an object. In some of these example implementations, such a determination is supplemented using ToF techniques, machine vision, location information and/or other movement sensing techniques.

In some implementations, given gestures and/or given body motions detected via, for example, the orientation sensor 350 or a location system, the example server device 2001 initiates a "Lockout/Tagout" procedure when the device 100 is used around potentially dangerous machinery. For example, in response to receiving a lockout/tagout gesture or orientation data and/or location data indicating proximity of the device 100 (and hence a hand) to a fast-moving conveyor belt, the server device 2001 shuts off and/or slows down the conveyor belt.

In some implementations, a given gesture sensed by the orientation sensor 350 pairs locations with items and/or confirms a location of an item at location. For example, the example device 100 may determine its location (e.g., based on a GPS or radio frequency locating system) when the device 100 captures a barcode. In the example of FIG. 20, the barcode is transmitted to the server device 2001 in conjunction with data indicative of the location of the device 100. In response, the example server device 2001 of FIG. 20 compares the received data with a database to confirm that the barcode (and, thus, the item to which the barcode is attached) is located in the same location as is indicated in the database. In some examples, the server device 2001 transmits a confirmation, or an error, message to the device 100.

In some implementations, the server device 2001 recognizes a hand-off event between two devices (e.g. two instances of the example device 100 of FIG. 1) working in cooperation. Each of the devices may transmit orientation data to the server device 2001 indicative of such a hand-off event, and the example server device 2001 of FIG. 21 responsively associates the two devices and/or tasks being performed by the two devices and/or initiates a transfer of information between the two devices. A handshake gesture is used, for example, to authenticate and/or authorize a session and/or data transmission.

Figure 21:
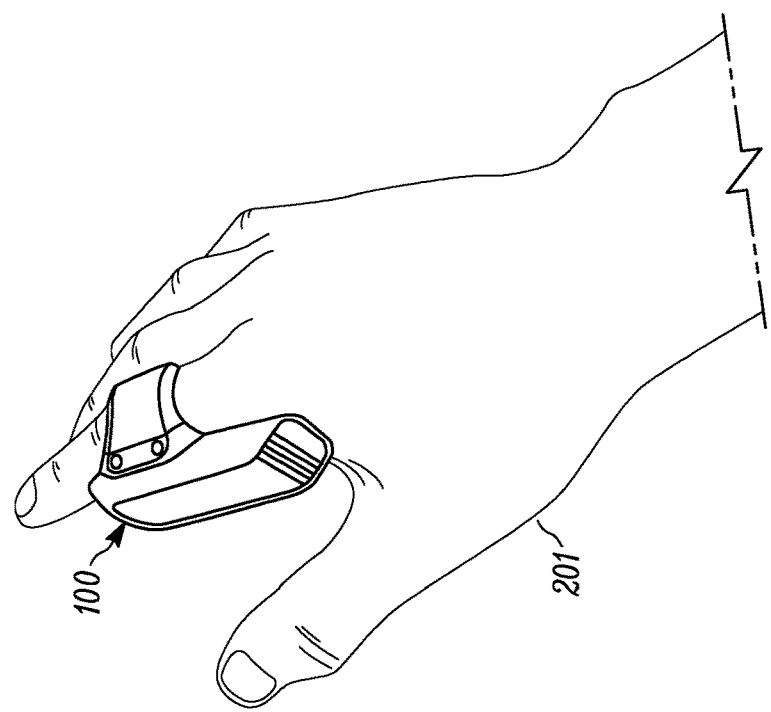
FIG. 21 depicts a system that includes the wearable device of FIG. 1 in communication with a heads-up device.
Figure 21:
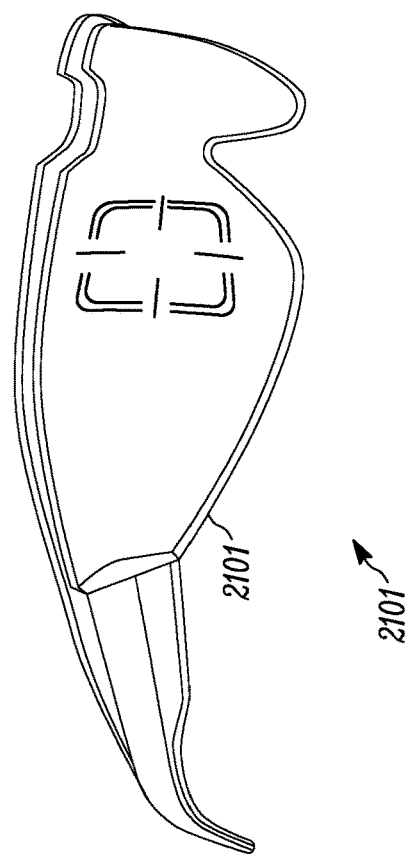

FIG. 21 depicts an example system 2100 that includes the example device 100 of FIG. 1, mounted to the hand 201, and a heads-up device (HUD) 2101. In the example of FIG. 21, the device 100 and the HUD 2101 communicate, for example, using the interface 324 of the device 100 and a communication interface of the HUD 2101 (e.g. using a Bluetooth™ connection). The example HUD 2101 of FIG. 21 may be worn by the same user that is wearing the device 100 on the hand 201. The example HUD 2101 of FIG. 21 provides augmented reality (AR) images to the user while, for example, the user views the device 100 through the HUD 2101. In some implementations, the device 100 does not include the touch display 117 and/or other indicators, and the device 100 include an AR identifier on a top or back surface and/or any surface detectable by the HUD 2101 when the device 100 is mounted to the hand 201, such that the HUD 2101 can detect a position and orientation of the device 100 relative to the HUD 2101. By detecting the AR identifier, the HUD 2101 provides one or more AR images comprising one or more virtual displays that appear to be located on one or more surfaces of the device 100, which may enable a user to interact with the virtual displays via, for example, touch gestures, which are detectable by the HUD 2101 and/or at touch sensors located on the same surfaces of the device 100 on which the one or more virtual displays are provided.

In some examples, when the touch display 117 is present, the touch display 117 is configured as a HUD controller for the HUD 2101, which may enable a warehouse worker wearing the device 100 and the HUD 2101 to accurately target a barcode with a finger and control the HUD 2101 with a thumb, for example, to scroll through menus viewed through the HUD 2101 and/or activate functions at the HUD 2101.

Figure 22:
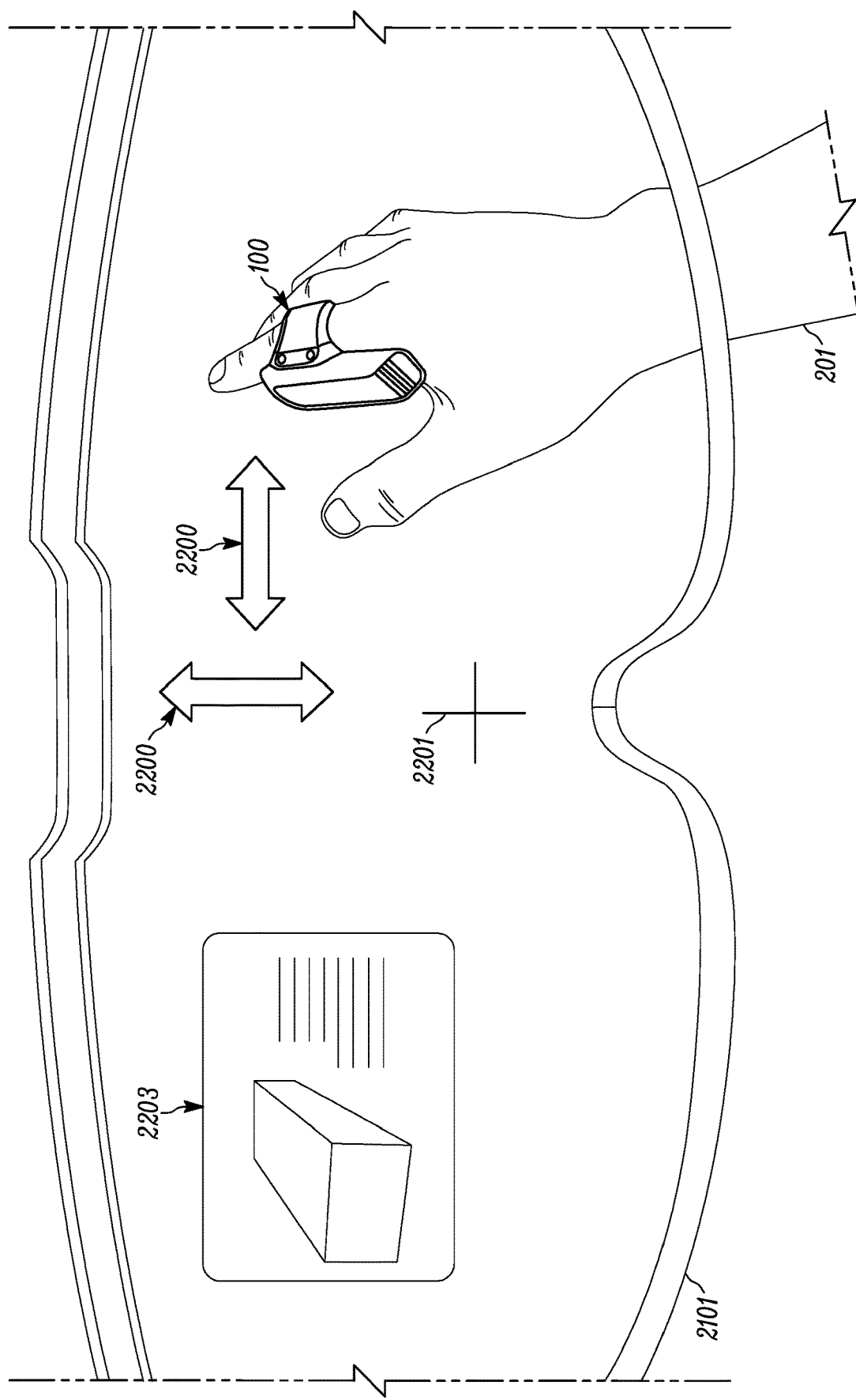
FIG. 22 depicts the system of FIG. 21 in use.

For example, FIG. 22 depicts an example view through the HUD 2101 that includes the device 100 mounted to the hand 201. In the illustrated example, gestures 2200 made with the device 100 mounted to the hand 201, as detected by the HUD 2101, trigger the HUD 2101 to, for example, move a cursor 2201 around a display of the HUD 2101 in accordance with, for example, characteristic(s) of the gestures 220 (e.g. depending on whether the gestures 2200 indicate an up, down, left and/or right movement of the cursor 2201), overlay augmented reality data 2203 on top of objects viewed through the HUD 2101, and/or control a view of the HUD 2101 (e.g. types of information rendered by a display of the HUD 2101),In some examples, the device 100 is configured as a remote controller for the HUD 2101, enabling a user to scroll, change a view, and/or confirm an action. In some examples, moving the device 100 causes the cursor 2201 at the HUD 2101 to be moved by the user.

In some implementations, the HUD 2101 adds augmentation images to items being picked up to facilitate an uninterrupted view and/or workflow through a facility. For example, a user may use the device 100 and/or a finger to virtually paint an item with, for example, a color, to identify the item and/or a group, and/or a location of the item, and/or place to put the item and/or to identify an item as an exception and/or special or priority handling.

In some implementations, the device 100 is located elsewhere on a user's body and/or on user's clothing, for example when the mounting device 121 is detachable and/or interchangeable with other mounting devices used to mount device to locations other than user's hand. When the HUD 2101 is being used in combination with the device 100, located somewhere other than a hand, the example HUD 2101 of FIGS. 20 and 21 detects a position of a finger of hand pointing at an item to be scanned, to "paint" the target, and then triggers the device 100 to scan the item and/or direct control the data capture component 113 to position the pointing direction 115 towards the item (which may include, for example, a barcode, a box, or a package). In such implementations, a location of the device 100 mounted on the user enables the data capture component 113 to capture data in a direction that a finger of the user is pointing.

Figure 23:
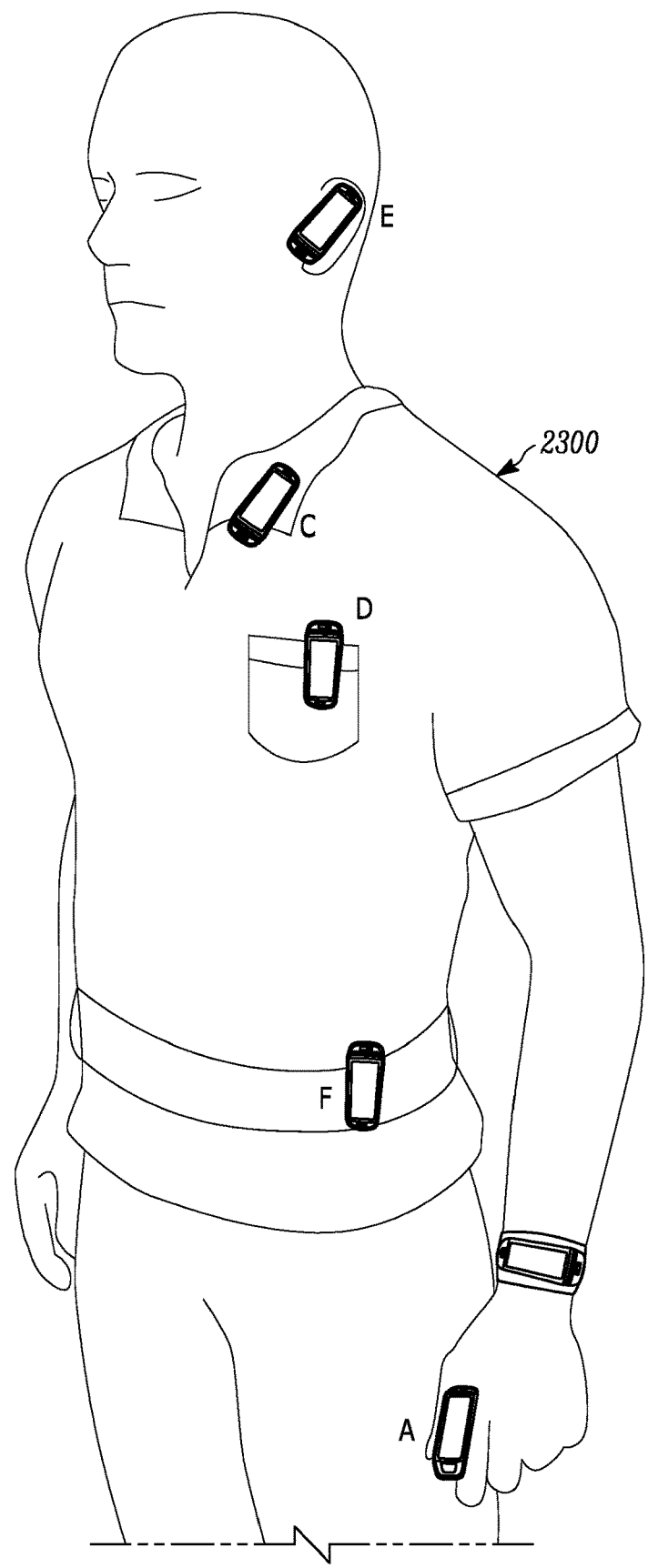
FIG. 23 depicts the example wearable device of FIG. 1 being mounted at different user locations.

FIG. 23 depicts examples of locations A, B, C, D, E, F at a user 2300 where the device 100 may be mounted (e.g. body and/or clothing), with location A being on an index finger of the user 2300. For example, the device 100 may be detachable from a ring (e.g. the mounting device 121) and mounted to one of other locations B, C, D, E, F using other types of mounting devices configured to mount to the device 100 to one or more of a lapel, a collar, an ear, a breast pocket, a wrist, or a belt. Depending on a location of the mount, different modalities of the device 100 are activated. For example, a voice mode is activated when mounted to an ear. Furthermore, the mounting device may be configured to communicate with the controller 320 of the device 100 to indicate a mode to which the device 100 is to be controlled. For example, if the mounting device comprises an earpiece, the earpiece may include a barcode and/or an RFID tag and/or an NFC tag, and the like, storing given mode data which may be read by the device 100 (e.g. using the data capture component 113, an RFID reader, and/or an NFC reader at the device 100) which may cause the controller 320 to enter an associated mode indicated by the given mode data.

Figure 24:
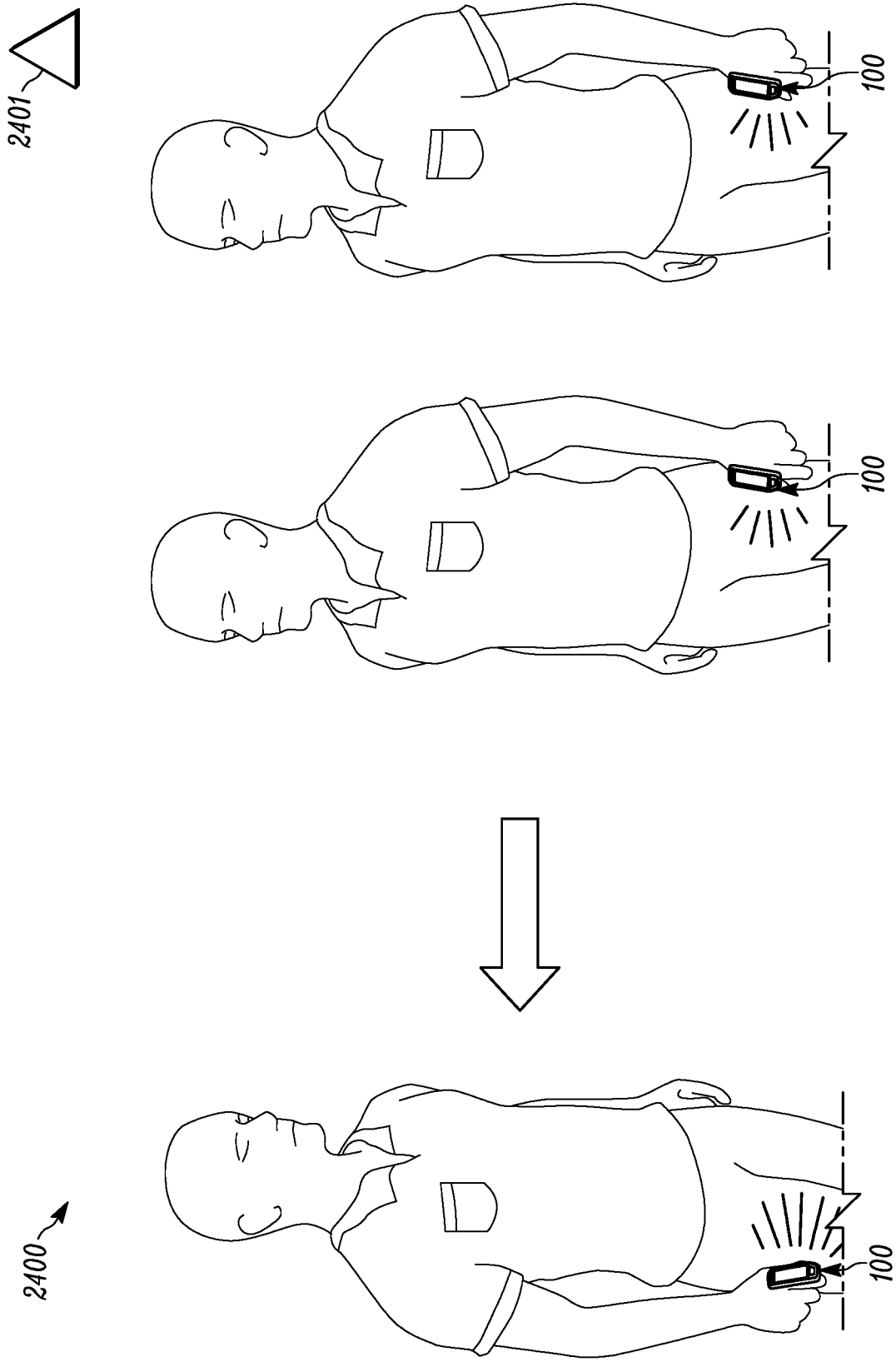
FIG. 24 depicts a system that includes a mesh network formed by a plurality of the wearable devices of FIG. 1.

In some implementations, a plurality of devices 100 located in a facility form a mesh network. For example, FIG. 24 depicts a system 2400 of the devices 100 worn by workers in a facility that includes an access point 2401 (e.g., a WiFi access point and/or an access point to a server device (such as server device 2001)). The devices 100 close to the access point 2401 may communicate with the access point 2401. Some of the devices 100 farther from access point 2401 may not be able to communicate with the access point 2401. However, data for transmission to the access point 2401 may be conveyed between the devices 100 to the access point 2401, and vice versa. Hence, the devices 100 form a mesh network that may cover areas of the facility where there are gaps in WiFi and/or access point coverage and/or when an access point fails. The example system 2400 of FIG. 24 may be used to convey warnings between the devices 100 regarding, for example, hazards such as approaching forklift trucks and/or evacuation notifications.

Provided herein are devices that may be worn on a hand and located between a thumb and index finger, using a ring, a mesh, a glove, and other types of mounting devices, with a touch display of the devices being accessible to the thumb, such that the device may be operated using one hand and specifically the thumb. In some implementations, the device includes a data capture component that may be aimed along the index finger and the thumb may be used to trigger the data capture device. Such implementations may be used in warehousing environments and/or facilities and may be further configured to communicate with a server device and/or HUDs and/or other devices.

In the foregoing specification, specific implementations have been described. However, one of ordinary skill in the art appreciates that various modifications and changes may be made without departing from the scope of the specification. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting implementation the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some implementations may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used.

Moreover, an implementation may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

We claim:

1. A mobile device comprising:
   a housing having
      a proximal end, a distal end, and a longitudinal axis between the proximal end and the distal end;
      a lateral axis perpendicular to the longitudinal axis; and
      a third axis perpendicular to each of the longitudinal axis and the lateral axis;
   a data capture component, a pointing direction of the data capture component extending from the distal end;
   a touch display, a front surface of the touch display extending along the longitudinal axis and the lateral axis, the third axis normal to the front surface; and
   a mounting device configured to mount the housing to a hand such that the pointing direction of the data capture component points away from a wrist, the proximal end is located towards a palm of the hand, the distal end is located towards tips of fingers of the hand with the fingers extended, the longitudinal axis located between an index finger and the thumb of the hand, and the front surface of the touch display is accessible to a thumb of the hand.

2. The mobile device of claim 1, wherein at least the housing and the touch display are symmetric about the longitudinal axis.

3. The mobile device of claim 1, wherein the mounting device comprises a ring.

4. The mobile device of claim 1, wherein the mounting device comprises a webbing configured for attachment between an index finger and the thumb of the hand.

5. The mobile device of claim 1, wherein the mounting device comprises a glove.

6. The mobile device of claim 1, wherein an orientation of a display rendered at the touch display is configurable between a right-hand mode and a left-hand mode.

7. The mobile device of claim 1, wherein the data capture component comprises a camera, a lens of the camera located at the distal end, the lens defining the pointing direction.

8. The mobile device of claim 1, wherein the data capture component comprises a scanner, a data capture end of the scanner located at the distal end, the data capture end defining the pointing direction.

9. The mobile device of claim 1, wherein the data capture component comprises one or more of a camera, a scanner, a laser-based scanner, a laser-based engine, and an image, a data capture end of the data capture component located at the distal end, the data capture end defining the pointing direction.

10. The mobile device of claim 1, wherein the pointing direction is one or more of parallel to the longitudinal axis, perpendicular to the lateral axis, and perpendicular to the third axis.

11. The mobile device of claim 1, wherein the pointing direction is controllable using the touch display.

12. The mobile device of claim 1, wherein the touch display is configured to activate the data capture component when touch input is received at the touch display.

13. The mobile device of claim 1, wherein the touch display is configured to indicate a successful data capture by the data capture component.

14. The mobile device of claim 1, further comprising an electronic visual indicator located at the proximal end, the electronic visual indicator configured to indicate a successful data capture by the data capture component.

15. The mobile device of claim 1, further comprising a speaker configured to indicate a successful data capture by the data capture component.

16. The mobile device of claim 1, further comprising a processor interconnected with the data capture component and the touch display, the processor configured to control the data capture component to initiate a data capture when touch input is received at the touch display.

17. The mobile device of claim 16, wherein the processor is configured to control one or more of the touch display, a speaker, and an electronic visual indicator, located at the proximal end, to indicate a successful data capture by the data capture component.

* * * * *